(12) United States Patent
Brister

(10) Patent No.: US 6,575,131 B2
(45) Date of Patent: *Jun. 10, 2003

(54) SAFETY FUEL TANK AND FILLER CAP APPARATUS

(76) Inventor: Charles Brister, 505 Ellis Rd., Amite, LA (US) 70422

(*) Notice: Subject to any disclaimer, the term of this patent is extended or adjusted under 35 U.S.C. 154(b) by 0 days.

This patent is subject to a terminal disclaimer.

(21) Appl. No.: 09/882,532

(22) Filed: Jun. 15, 2001

(65) Prior Publication Data

US 2001/0042534 A1 Nov. 22, 2001

Related U.S. Application Data

(63) Continuation-in-part of application No. 09/712,758, filed on Nov. 14, 2000, which is a continuation-in-part of application No. 09/655,033, filed on Sep. 5, 2000, which is a continuation-in-part of application No. 09/452,653, filed on Dec. 1, 1999, now Pat. No. 6,260,516, which is a continuation-in-part of application No. 09/288,402, filed on Apr. 8, 1999, now Pat. No. 6,112,714, which is a continuation-in-part of application No. 09/267,877, filed on Mar. 11, 1999, now abandoned.

(51) Int. Cl.[7] .............................................. F02B 77/00
(52) U.S. Cl. ........................ 123/198 D; 123/198 DC; 123/41.15
(58) Field of Search ........................ 123/41.15, 41.54, 123/198 D, 198 DC

(56) References Cited

U.S. PATENT DOCUMENTS

| 416,103 | A | 11/1889 | Harter |
|---|---|---|---|
| 1,117,741 | A | 11/1914 | Wood, Jr. |
| 2,598,067 | A | 5/1952 | O'Brien |
| 3,057,140 | A | 10/1962 | Ridenour et al. |
| 3,387,874 | A | 6/1968 | Holtkamp |
| 3,390,909 | A | 7/1968 | Nagel |
| 3,568,421 | A | 3/1971 | Smith et al. |
| 3,664,698 | A | 5/1972 | Stropkay |
| 3,750,378 | A | 8/1973 | Thorud et al. |
| 3,885,547 | A | 5/1975 | Doepke et al. |
| 3,942,604 | A | 3/1976 | Black III |
| 3,969,875 | A | 7/1976 | Nofel |
| 4,236,494 | A | 12/1980 | Fairchild |
| 4,277,094 | A | 7/1981 | Roue |
| 5,044,678 | A | 9/1991 | Detweiler |
| 5,551,866 | A | 9/1996 | Josephs et al. |
| 6,112,714 | A | 9/2000 | Brister |
| 6,260,516 | B1 * | 7/2001 | Brister ............... 123/198 D |
| 6,397,791 | B1 * | 6/2002 | Brister ............... 123/198 D |

* cited by examiner

Primary Examiner—John Kwon
(74) Attorney, Agent, or Firm—Garvey, Smith, Nehrbass & Doody, LLC; Charles C. Garvey, Jr.; Brett A. North

(57) ABSTRACT

A safety fuel tank and filler cap apparatus is disclosed for use with a powered implement such as a lawnmower, tiller, weed trimmer or the like. The apparatus includes a switch member mounted on a fuel cap and tank that disallow engine operation when the filler cap is separated from the tank such as during refueling. In another embodiment, the apparatus includes a locking mechanism that can be mounted on the engine body or fuel tank that disallows removal of the filler cap until the engine has cooled to a predetermined temperature that will not cause the fuel to ignite.

93 Claims, 30 Drawing Sheets

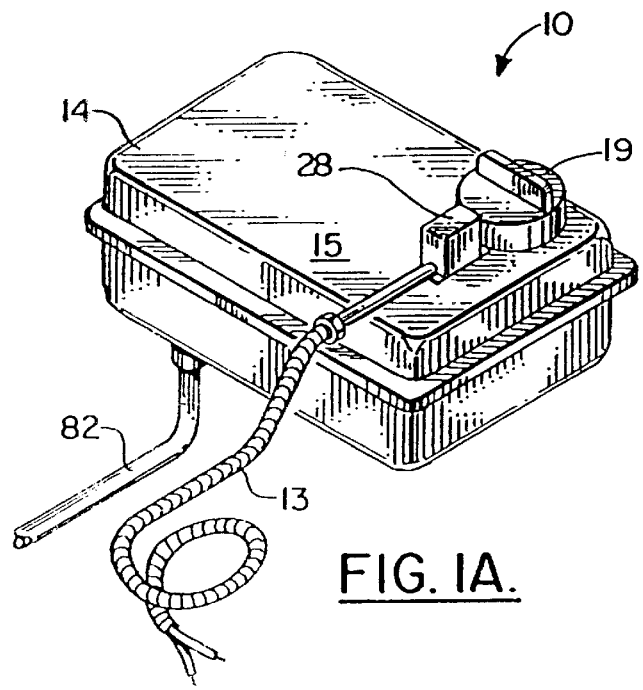
FIG. 1A.
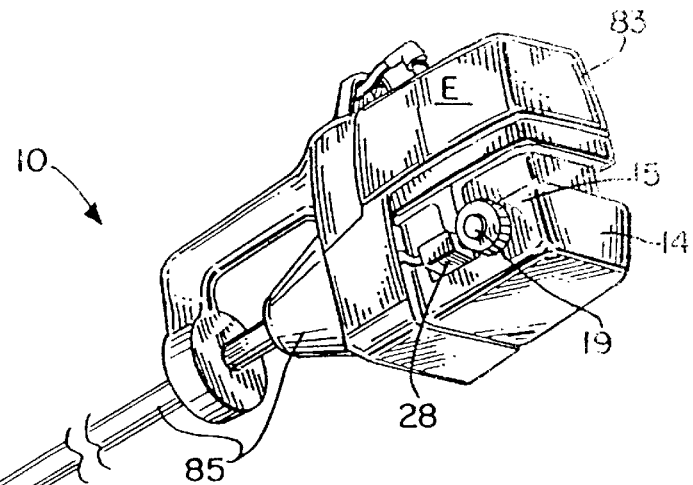
FIG. 1B.
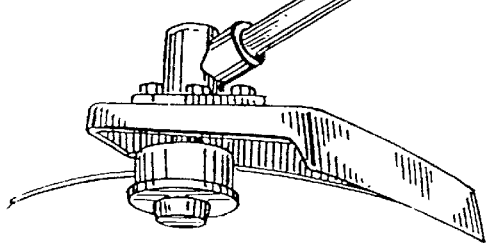

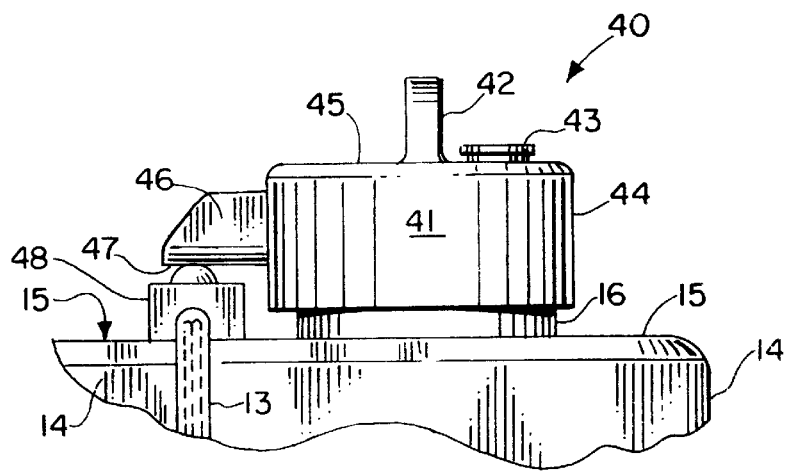
FIG. 4.
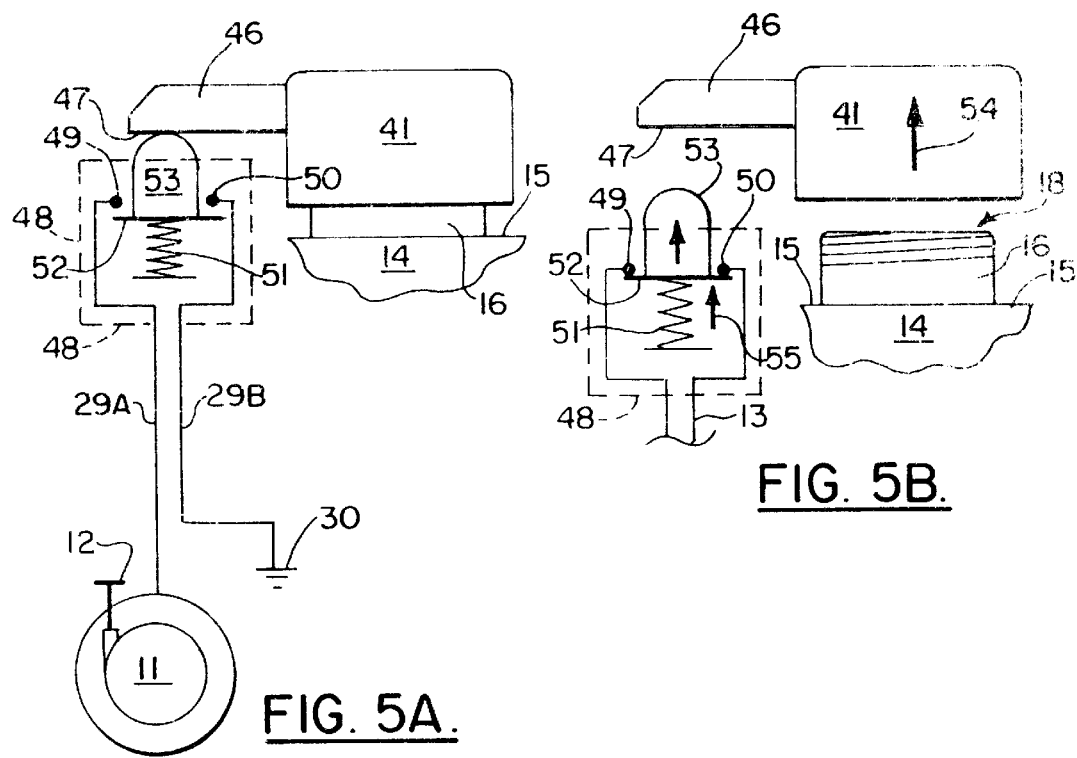
FIG. 5B.
FIG. 5A.

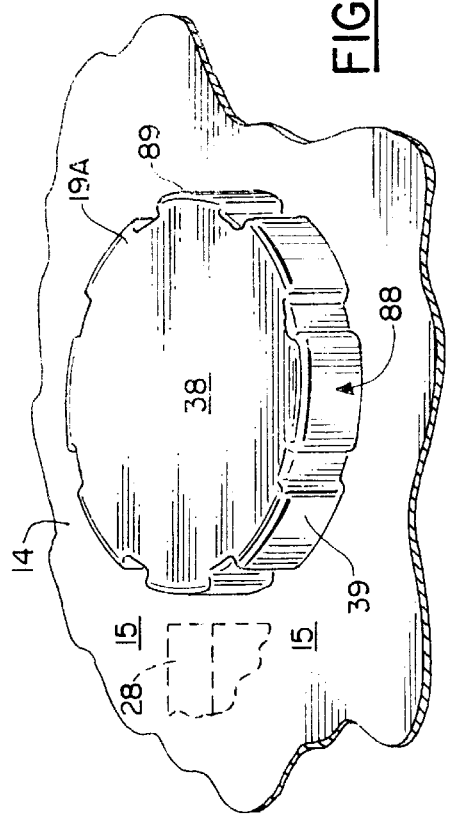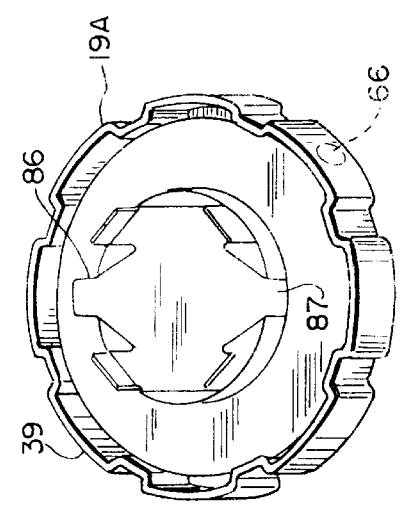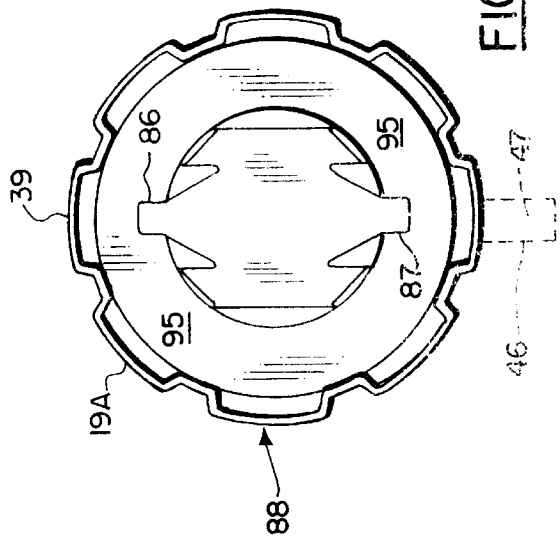

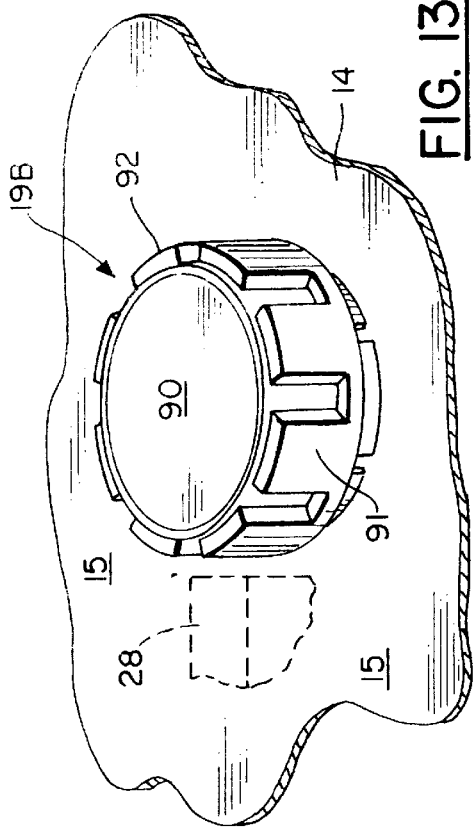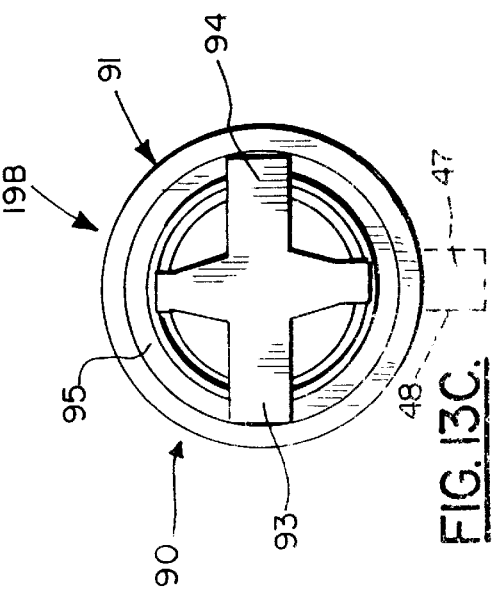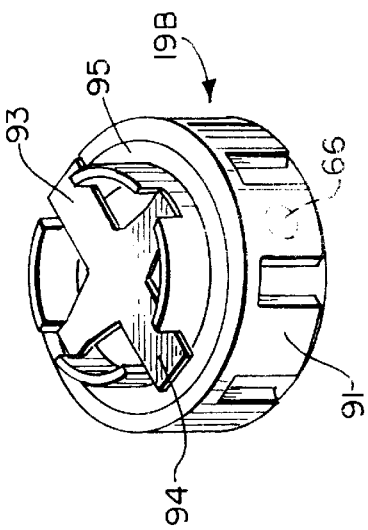

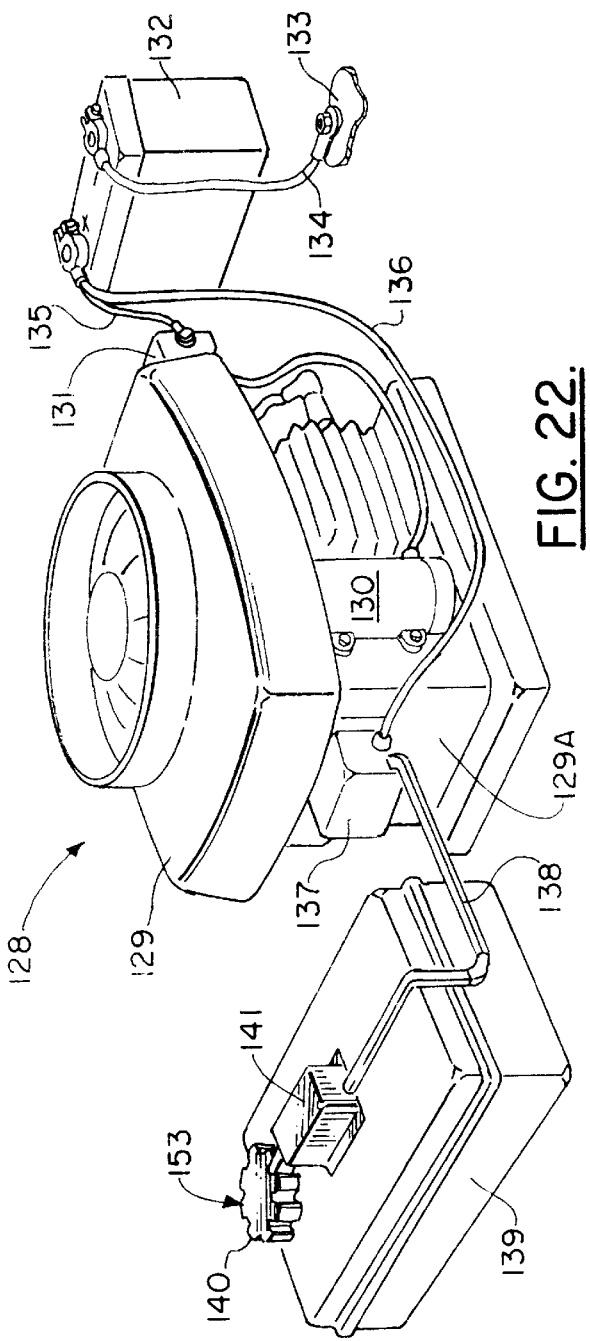
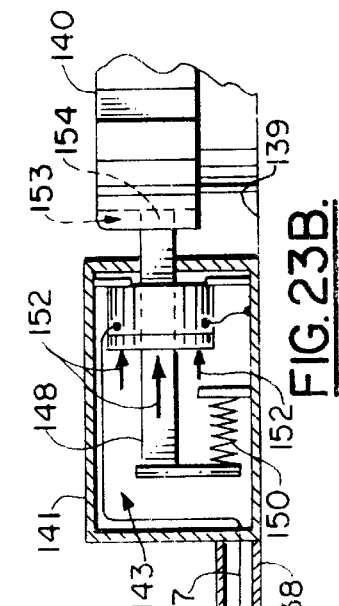
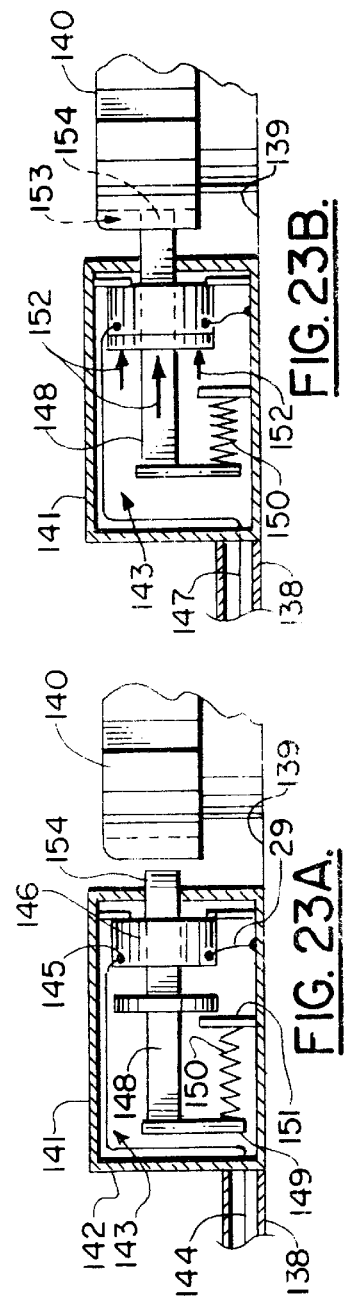

SAFETY FUEL TANK AND FILLER CAP APPARATUS

CROSS-REFERENCE TO RELATED APPLICATIONS

This is a continuation-in-part of U.S. patent application Ser. No. 09/712,758, filed Nov. 14, 2000, which is a continuation-in-part of U.S. Ser. No. 09/655,033, filed Sep. 5, 2000, which is a continuation-in-part of U.S. Ser. No. 09/452,653, filed Dec. 1, 1999, now U.S. Pat. No. 6,260,516 which is a continuation-in-part of U.S. patent application Ser. No. 09/288,402, filed Apr. 8, 1999 (now U.S. Pat. No. 6,112,714), which is a continuation-in-part of U.S. patent application Ser. No. 09/267,877, filed Mar. 11, 1999 now abandoned). Priority to all applications is hereby claimed and all are hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

1. Field

The present invention relates to small internal combustion engines of the type that are used to power lawn mowers, tillers, lawn vacuums, weed trimmers, snow blowers, water blasters and the like. Even more particularly, the present invention relates to an improved safety fuel tank and filler cap apparatus which enters a safety mode and alerts a user who grasps and turns the fuel cap (or when the fuel cap loosens) that gasoline should not be added to the fuel tank when various conditions exist. In one embodiment the apparatus automatically disables the magnetoelectric generator when a fuel filler cap portion of the apparatus is separated from a fuel filler flange such as when the fuel filler cap inadvertently disconnects from the fuel tank or is removed for filling the fuel tank. In another embodiment, the safety fuel tank and filler cap apparatus disallows removal of the fuel filler cap portion of the apparatus from the fuel tank when the engine is too hot, such as above a selected safe threshold temperature value.

2. General Background

The flash point of a liquid such as gasoline should not be confused with the temperature necessary to ignite the vapors, for unless a source of heat considerably hotter than the flash point of the fuel comes into direct contact with the vapors, the fuel will merely give off vapors without burning. An essential factor in the process of combustion is oxygen. Without oxygen, even the most flammable vapors will not combust. Under normal conditions, a flame draws the amount of oxygen necessary to sustain combustion from the air. When the oxygen content of the air falls below about 15%, there is an immediate extinguishment of practically all flames.

There is typically a wide temperature difference between the flash point of a fuel and the ignition temperature. For example, the flash point (vapor given off) of gasoline is minus 43 degrees centigrade (minus 45.4 degrees Fahrenheit), and the ignition temperature (heat necessary to ignite the mixture) is about 257 degrees centigrade (494.6 degrees Fahrenheit). A small flame can be drawn into lube oil which is at average room temperature and it will not burn, but with the addition of burning gasoline, vapors soon rise and burn to raise the temperature of the surrounding oil to the flash point.

Every year, fires cause serious and sometimes fatal bodily injury to operators of outdoor, yard and garden, and like implements such as lawn mowers, lawn vacuums, weed trimmers, water blasters, and the like. One of the most common safety problems is associated with the attempt by individuals to add gasoline to the internal combustion engine of a lawn mower or like implement that is still running. Sometimes, an implement gradually loosens the gas filler cap because of vibration. Typically, these implements position the fuel tank and its filler neck at or near the engine block.

Fuel that spills from the fuel tank or from a supply container when filling the tank may come into contact with hot surfaces on the engine block or accessories. If the user is not paying close attention to the gas tank and its filler cap, gasoline can begin to leak when the cap is loosened. This problem is especially acute with rear drive type implements such as all terrain vehicles, go-karts, riding lawn mowers and lawn tractors wherein the gasoline tank may be behind the operator or underneath a seat or hood preventing the user from seeing it. Many tractor style riding lawn mowers have such a hidden fuel tank and filler cap.

Many of these implements are operated by adolescent children that are not warned sufficiently by their parents about the danger of filling tanks with gasoline when the implement or vehicle is hot from operation.

Many manufacturers use decal warning stickers and user's manual warnings to warn a user to not remove the fuel filler cap until the engine cools for at least a couple of minutes.

Generators are often filled with gasoline by a user when still running because the user does not want to interrupt the flow of electricity.

All of the above situations are hazardous if the engine continues to run when the filler cap is removed or becomes removed, or if a user attempts to fill the fuel tank when the engine is very hot.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention.

No feature of the invention is critical or essential unless it is expressly stated as being "critical" or "essential."

SUMMARY

The present invention provides an improved safety fuel tank and filler cap apparatus for supplying fuel to an implement powered by an internal combustion engine that can be started with a magnetoelectric generator. The implement can be, for example, a lawn mower, go-kart, garden tractor, lawn vacuum, snow blower, tiller, chain saw, weed trimmer, hedge clipper, or log splitter.

The apparatus includes an exposed fuel tank having a fill opening, a fuel filler flange surrounded by an adjoining fuel tank outer surface, the flange extending a short distance from the filler opening in the fuel tank wall. A filler cap fits the fuel filler flange to form a closure of the tank at the fill opening, the filler tank and adjoining fuel tank outer surface being configured to enable a user to grip and turn the fuel filler cap. A switch is interfaced between the fuel tank and filler cap that disables the magnetoelectric generator when the filler cap is removed from the fuel filler tank. This construction prevents the user from filling the fuel tank with gasoline when the engine is running.

The switch can be a magnetic switch, a photoelectric switch, or a mechanical switch, for example a button switch, toggle switch, rocker switch. The mechanical switch can be a switch that moves between operating and disabled positions, the switch including a moving member that shifts positions when the fuel filler cap is separated from the fuel filler flange.

The switch can include a magnetic switch member mounted in the fuel tank and another magnetic switch member mounted on the filler cap. The switch can include a switch member mounted on the filler cap that does not interfere with the sealing of the fuel filler flange with the filler cap, being spaced from the threads or bayonet connectors that join the cap and tank.

The filler cap can have a top, an annular skirt with internal threads, and wherein the switch member is mounted on the annular skirt in between the threads and the top. Such internal threads form a threaded engaged connection with external threads on the fuel filler flange. The fuel filler cap preferably has a top, an annular skirt with a threaded portion thereon, and an unthreaded outer surface and wherein the switch member is mounted on the annular skirt. The switch member can be mounted on an unthreaded portion of the filler cap.

In another embodiment, the present invention provides an improved safety fuel tank and filler cap apparatus for supplying fuel to an internal combustion engine that includes an exposed fuel tank having a fill opening, a fuel filler flange surrounded by an adjoining fuel tank outer surface, the flange extending a short distance from the filler opening in the fuel tank wall. A filler cap fits the fuel filler flange at the fill opening, the filler tank and adjoining fuel tank outer surface being configured to enable a user to grip and turn the fuel filler cap. A locking mechanism is interfaced between the fuel tank and filler cap that disallows removal of the filler cap. This construction prevents the user from filling the fuel tank with gasoline when the engine is still running or not running but still very hot.

The present invention also teaches and provides a powered implement having a frame, an internal combustion engine mounted on the frame that includes a magnetoelectric generator for starting the engine, and including an exposed fuel tank having a fill opening, a fuel filler flange surrounded by an adjoining fuel tank outer surface, the flange extending a short distance from the filler opening in the fuel tank wall and wherein a filler cap fits the fuel filler flange to form a closure of the tank at the fuel opening.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1A is perspective view of the preferred embodiment of the apparatus of the present invention used with an auxiliary tank;

FIG. 1B is a perspective view of the preferred embodiment of the apparatus of the present invention showing a powered implement in the form of a weed trimmer;

FIG. 4 is a side elevational view of a second embodiment of the apparatus of the present invention;

FIGS. 5A–5B are schematic sectional elevational views of the second embodiment of the apparatus of the present invention showing the switch in engine operating (FIG. 5A) and engine disabled (FIG. 5B) positions respectively;

FIGS. 12A, 12B, 12C are upper perspective, bottom perspective, and bottom views respectively of a filler cap construction having a bayonet type mount and that can be used with the embodiments of FIGS. 1–11;

FIGS. 13A, 13B and 13C are upper perspective, bottom perspective, and bottom views respectively of another filler cap construction having a bayonet mount that can be used with the embodiment of FIGS. 1–11;

FIG. 22 is a perspective view of a sixth embodiment of the apparatus of the present invention;

FIG. 23A is a fragmentary elevational view of the sixth embodiment of the apparatus of the present invention;

FIG. 23B is a fragmentary view of the sixth embodiment of the apparatus of the present invention shown in locking position;

DETAILED DESCRIPTION

Figure 1:
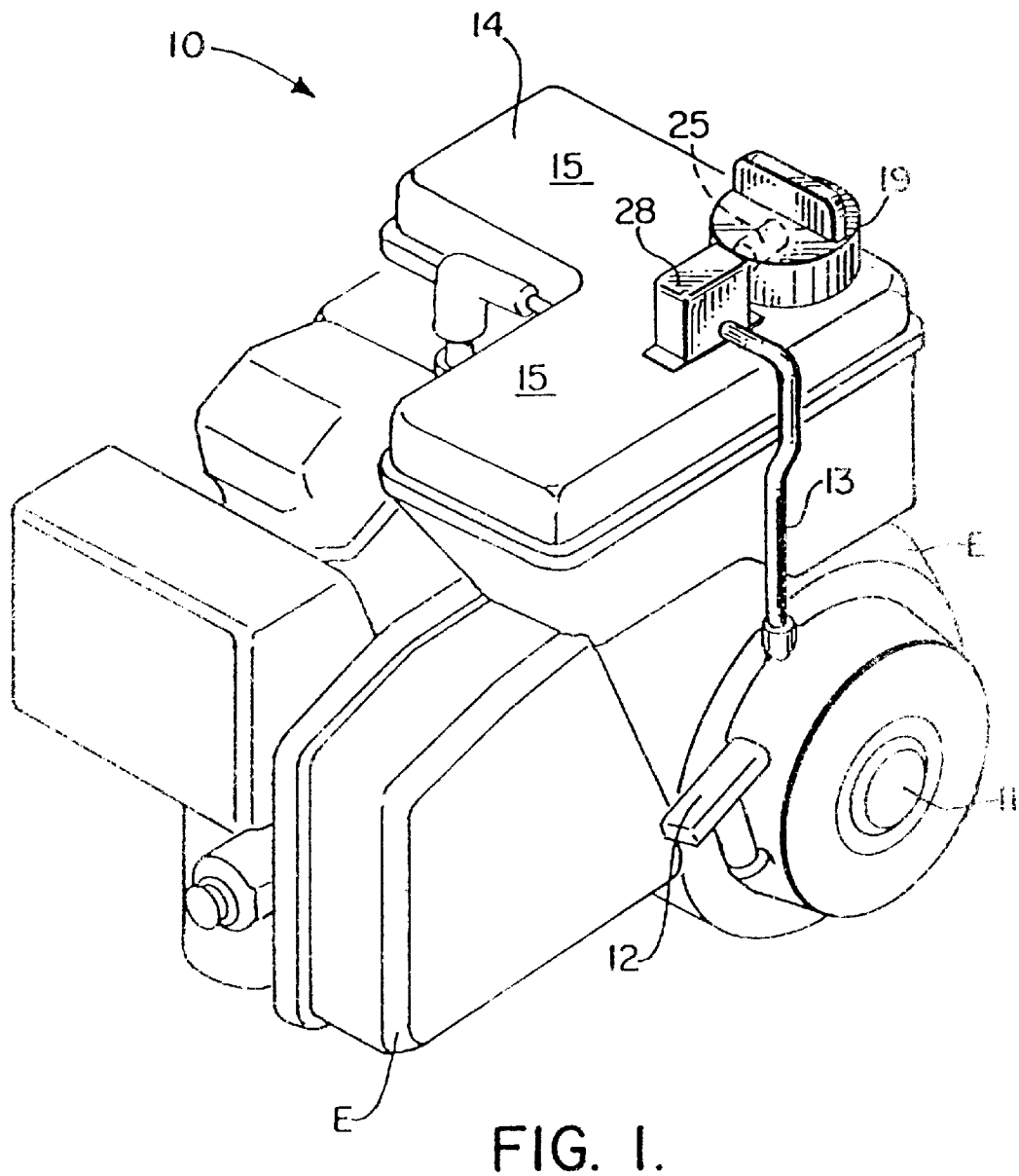
FIG. 1 is a perspective view of the preferred embodiment of the apparatus of the present invention.

FIGS. 1, 1A and 1B show a preferred embodiment of the apparatus of the present invention designated generally by the numeral 10 in FIGS. 1, 1A and 1B.

FIG. 1A shows the apparatus 10 of the present invention attached to an auxiliary fuel tank 14 having a fuel line 82.

In FIG. 1B, a powered implement is shown in the form of a weed trimmer that includes a frame 85 that supports an internal combustion engine E having fuel tank 14 and filler cap 19 with magnetic switch 28.

Safety fuel tank and cap apparatus 10 includes a safety system that disables internal combustion engine E if a user removes the fuel filler cap 19 from cylindrically shaped flange 16 of fuel tank 14. Engine E can be any small two stroke or four stroke engine for operating a lawnmower, tiller, weed trimmer, chainsaw, generator, go-kart, or the like. Engine E can be a type that includes a magnetoelectric generator 11 that can be operated with an electric starter (not shown) or a pull cord starter rope 12. In one embodiment of the present invention, electrical circuit 13, 28 is provided for disabling magnetoelectric generator 11 when filler cap 19 is removed from fuel tank 14. An electrical cable 13 extends between a switch 28 mounted on the upper surface 15 of fuel tank 14 and the magnetoelectric generator or "magneto" 11.

Figure 2:
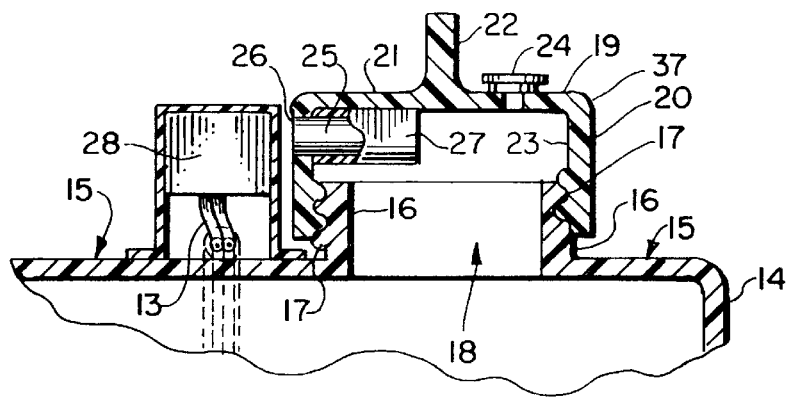
FIG. 2 is a partial sectional elevational view of the preferred embodiment of the apparatus of the present invention.

The fuel filler cap 19 in FIG. 2 provides an internally threaded portion 23 that interlocks with external thread 17 on cylindrically shaped flange 16. The cylindrically shaped flange 16 surrounds fuel tank opening 18.

Filler cap 19 is comprised of a circular top portion 21 and a generally cylindrically shaped annular skirt 20. The top portion 21 is joined to the skirt 20 at annular edge 37. Skirt 20 has an inner annular, generally cylindrically shaped surface 20A and an outer annular generally cylindrically shaped surface 20B. Skirt 20 outer surface 20B can be knurled or ribbed to ease gripping by a user. Inner surface 20B can be threaded (see FIGS. 2, 3A–3B, 5A–5B) or a bayonet mount (see FIGS. 14–15). Handle 22 is positioned on top 21 for enabling a user to remove cap 19 from flange 16 or for engaging cap 19 with flange 16. The cap 19 can include a vent 24 for releasing fumes.

The filler cap 19 can be an internally threaded cap as shown in FIGS. 1–11. Alternatively, the filler cap can be a bayonet type cap 19A, 19B as shown in FIGS. 12A, 12B, 12C, 13A and 13C. Such a bayonet mount type cap 19A, 19B is used on engines such as those sold under the marks Honda® and Briggs® for example.

A magnet 25 is embedded in the unthreaded upper portion of cap 19 next to top 21 as shown in FIG. 2. Magnet 25 provides an outer end 26 that is positioned next to the annular skirt 20. The inner end 27 of magnet 25 is positioned nearer the center of circular top as shown in FIG. 2.

Figures 3A, 3B:
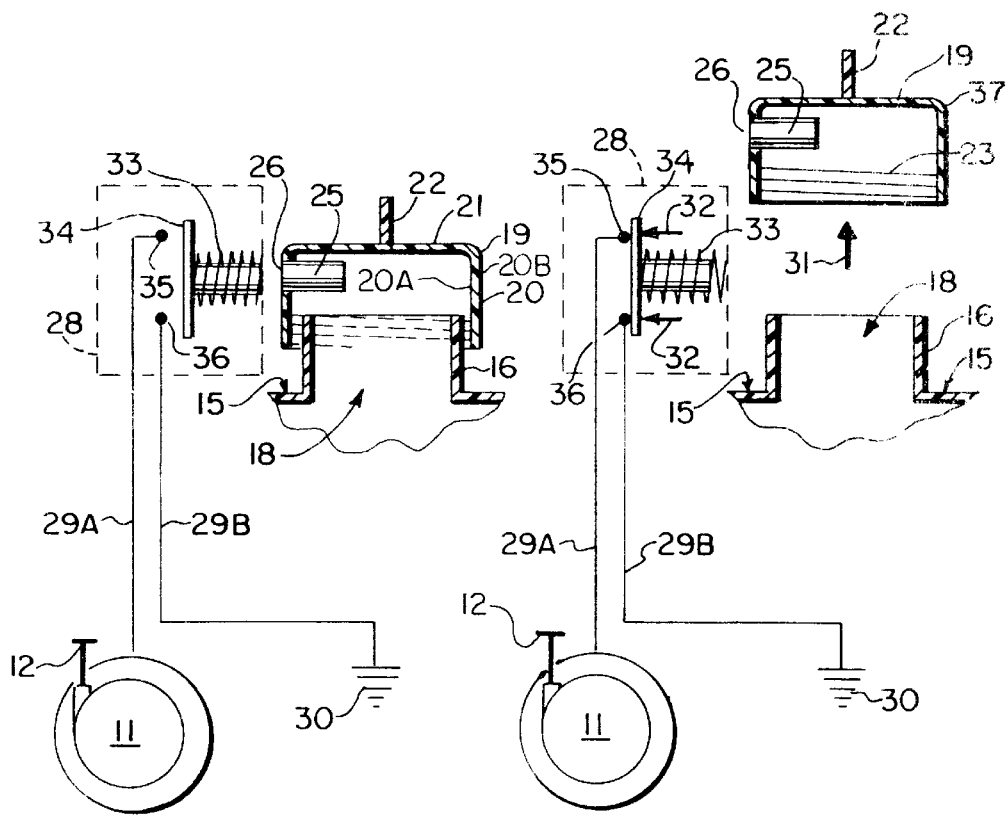
FIGS. 3A–3B are schematic diagrams of the preferred embodiment of the apparatus of the present invention shown in engine operating (FIG. 3A) and engine disabled (FIG. 3B) positions.

Switch 28 is preferably a magnetic member that is mounted on upper surface 15 of fuel tank 14 adjacent to cylindrically shaped flange 16. Magnetic switch 19 includes an electrical cable 29 that communicates with electrical cable 13 extending to magneto 11. The electrical cable 13 can include a pair of wire leads 29A, 29B as shown in FIGS. 3A, 3B. Lead 29B connects to ground 30 as shown in FIGS. 3A, 3B.

In FIG. 3A, the magnet 25 is shown with its outer end 26 positioned next to magnetic switch 28. Spring 33 is overcome by magnet 25 so that it pulls contact plate 34 toward magnet 25 and away from contact points 35,36. This condition shown in FIG. 3A occurs when the gas filler cap 19 is in a fully closed position. In this closed position, the magnet 25 is generally aligned with the magnetic switch 28 as shown in FIGS. 1, 1A, 1B, 2 and 3A.

In FIG. 3B, a user has separated the gas filler cap 19 from cylindrically shaped flange 18 as indicated schematically by arrow 31. In such a situation, the spring 33 forces contact plate 34 into contact with leads 35,36. Arrows 32 in FIG. 3B indicate schematically the movement of contact plate 34 into contact with points 35,36. In such a situation, electrical power generated by the magneto is unable to start the engine E.

In FIGS. 4, 5A and 5B, there is shown a second embodiment of the apparatus of the present invention designated generally by the numeral 40 in FIG. 4. Safety fuel tank and cap apparatus 40 includes a cap 41 having a handle 42. Cap 41 can also provide a vent 43. The cap 41 is comprised of a generally cylindrically shaped annular skirt 44 and a circular top 45.

An appendage 46 extends radially outwardly of skirt 41 as shown in FIG. 4, 5A and 5B. The appendage 46 has an under surface 47 that engages switch button 53 of button switch 48. The button switch 48 is shown in FIG. 5A in an operating position wherein appendage 46 holds the button 53 in a lowermost position that spaces contact plate 52 away from contacts 49, 50. As shown in FIG. 5B when cap 41 is removed from cylindrically shaped filler flange 16 as shown by arrow 54, the spring 51 moves switch button 53 upwardly so that contact plate 52 engages contacts 49, 50 as shown by arrow 55. In such a situation, the magneto 11 will not start the engine E.

Figure 6:
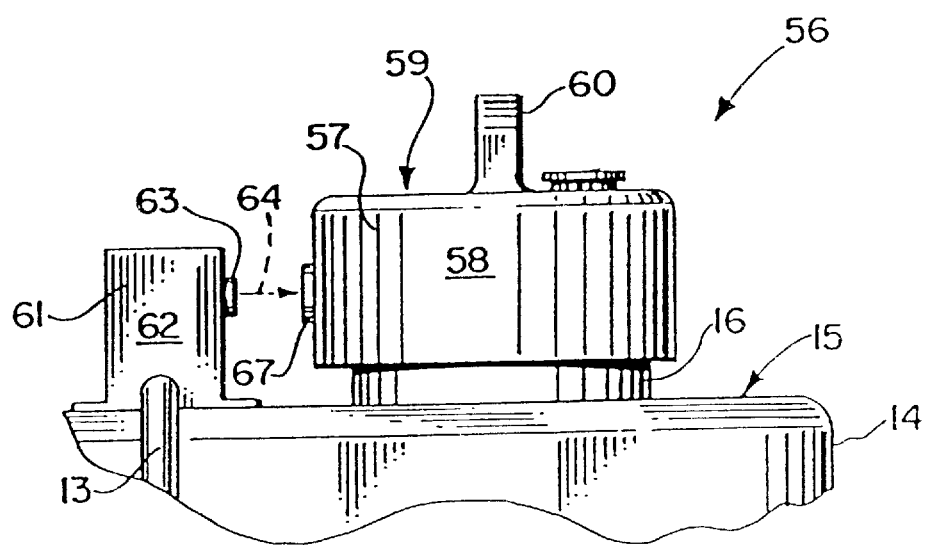
FIG. 6 is an elevational view of a third embodiment of the apparatus of the present invention.
Figure 7:
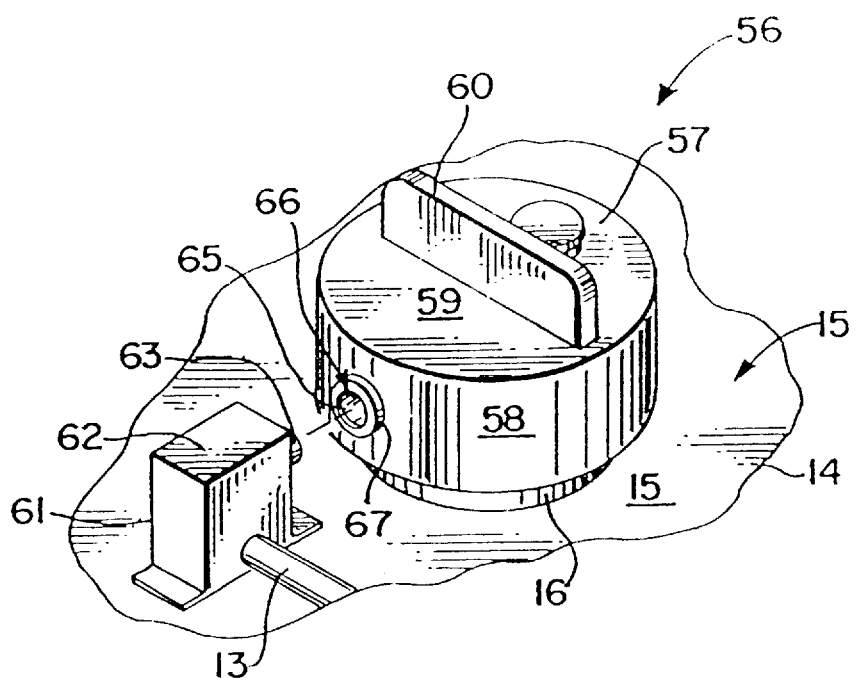
FIG. 7 is a perspective view of the third embodiment of the apparatus of the present invention.

FIGS. 6 and 7 show a third embodiment of the apparatus of the present invention designated generally by the numeral 56 in FIG. 7. Safety fuel tank and cap apparatus 56 features a filler cap 57 that is threadably engagable with annular skirt 16 as with the embodiments of FIGS. 1–5. Annular skirt 58 connects to a circular top 59 having handle 60. Switch 61 is mounted on the upper surface 15 of tank 14 as shown in FIGS. 6 and 7. The switch 61 includes a switch housing 62 that carries an electric eye 63. Such a switch 61 is commercially available. Arrow 64 in FIG. 7 indicates the communication between electric eye 63 and reflector 65 contained in opening 66 surrounded by annular rib 67. In the embodiment of FIG. 6 and 7, the electric eye is emitting a light source that reflects off reflector 65 and which is interrupted when cap 57 is removed from flange 16 so that the electrical cable 13 communicating with magneto 11 closes a circuit that prevents operation of magneto 11 to start engine E.

Figure 8:
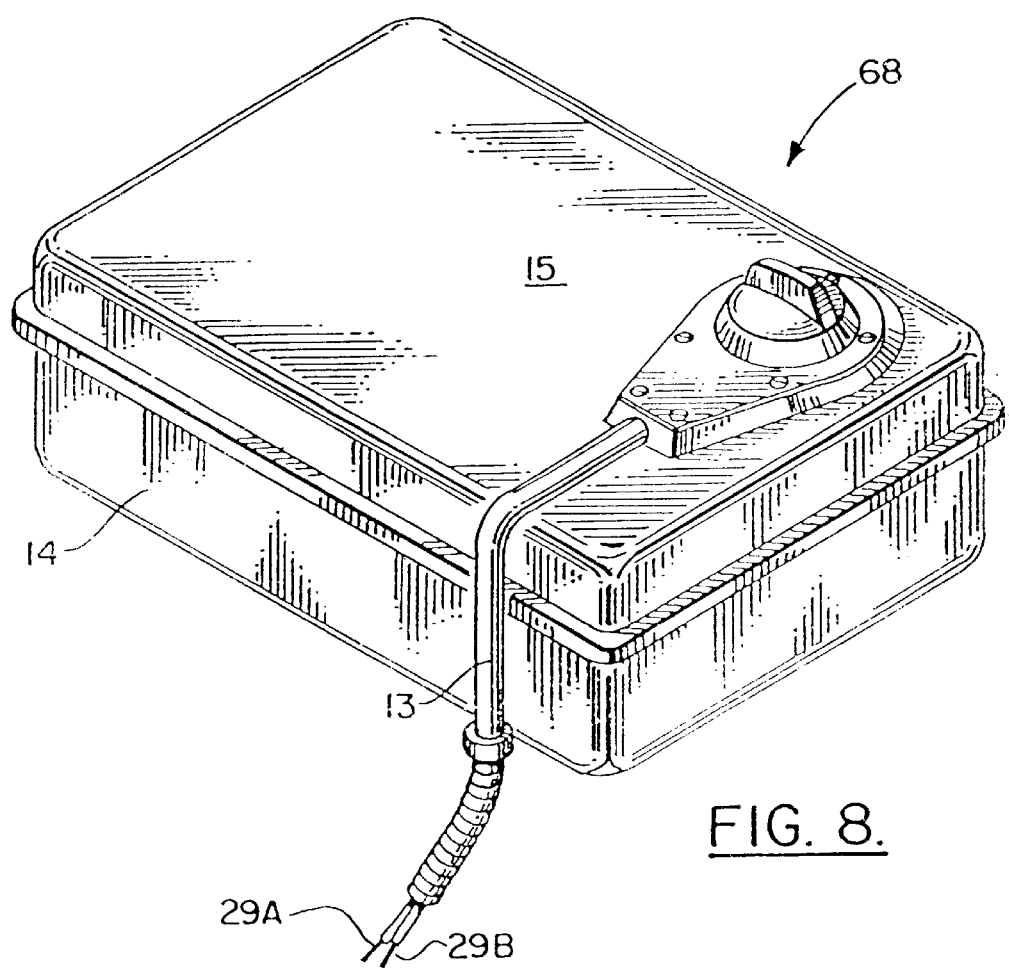
FIG. 8 is a perspective view of a fourth embodiment of the apparatus of the present invention.
Figure 9:
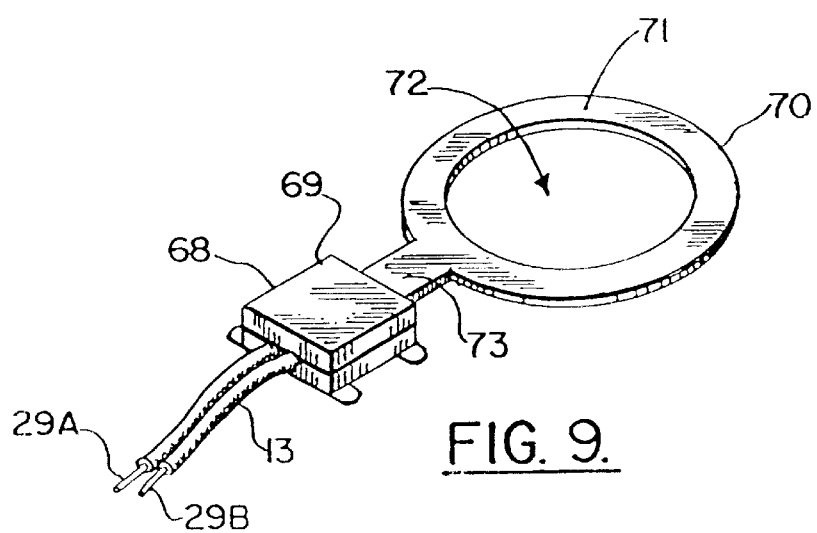
FIG. 9 is a partial perspective view of the fourth embodiment of the apparatus of the present invention.

FIGS. 8–11 show a fourth embodiment of the apparatus of the present invention designated generally by the numeral 68 in FIG. 8. Safety fuel tank and cap apparatus 68 includes a micro switch 69 having a switch arm 70 that includes a ring 71. The ring 71 surrounds opening 72 that fits over flange 16 and under filler cap 74 as shown in FIGS. 8–11. The ring 71 attaches to micro switch 69 with beam 73. Such a micro switch 69 is commercially available.

Figure 10:
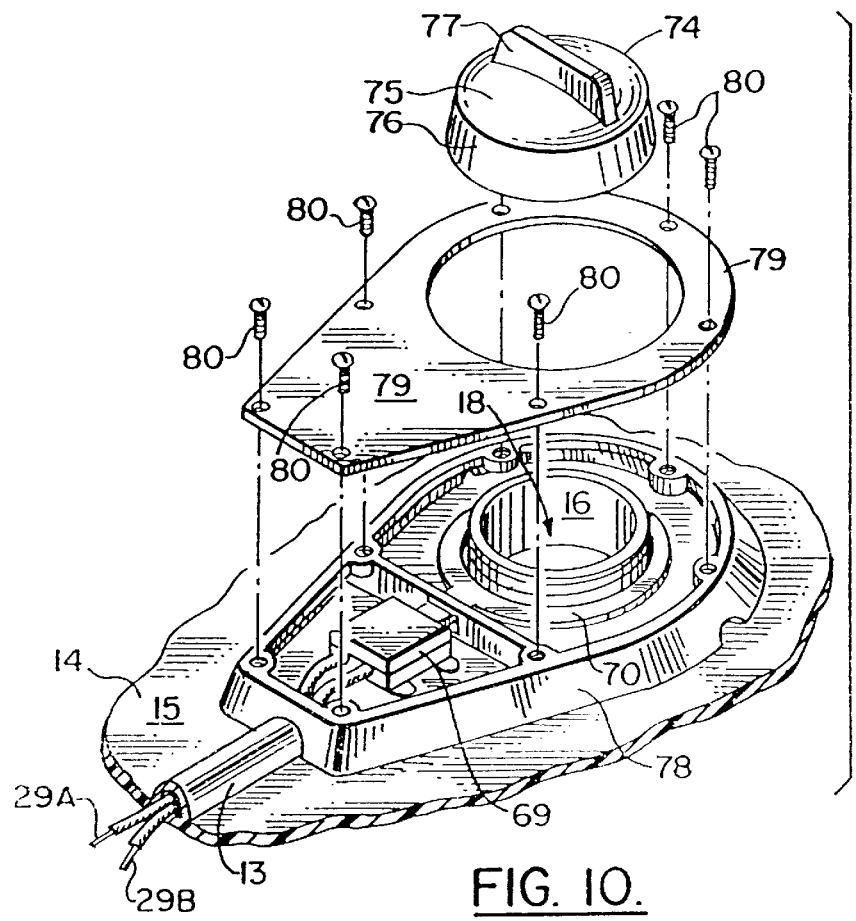
FIG. 10 is an exploded perspective view of the fourth embodiment of the apparatus of the present invention.
Figure 11:
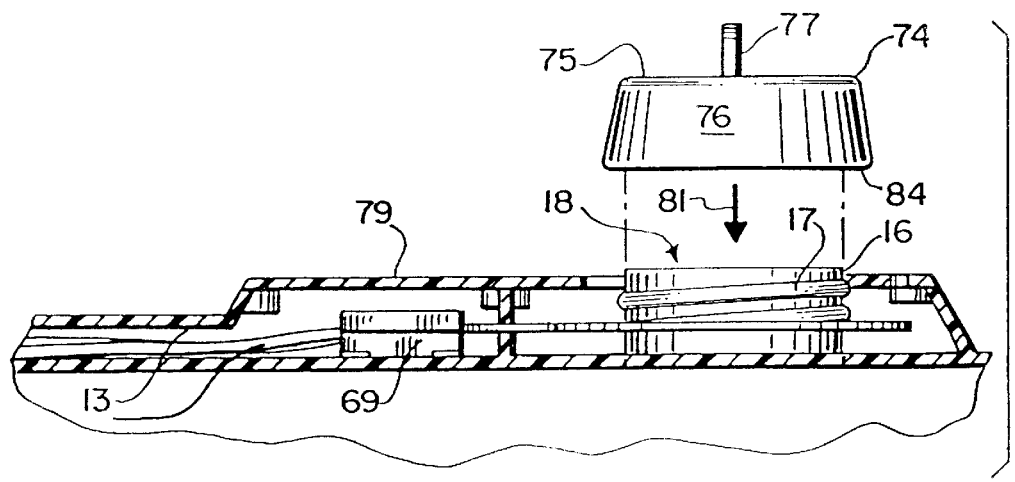
FIG. 11 is a sectional elevational, exploded view of the fourth embodiment of the apparatus of the present invention.

Filler cap 74 has a circular top 75 and a cylindrically shaped annular skirt 76. Handle 77 enables cap 74 to be able to be manipulated and turned such as when it is removed from or engaged with cylindrically shaped flange 16. A shroud 78 is provided for covering the combination of the micro switch 69 and its arm 70 as shown in FIGS. 10 and 11. The shroud 78 communicates with cover 79 that can be bolted over the shroud 78 using a plurality of bolts 80. Arrow 81 in FIG. 11 shows how the micro switch 69 is closed when the cap 74 is threaded upon flange 16 as indicated schematically by arrow 81 in FIG. 11. In such a situation, the lower annular edge 84 of cap 74 engages ring 71 of switch arm 70 forcing it downwardly and operating switch 69 to deactivate magneto 11 via electrical cable 13.

Filler cap 19A in FIGS. 12A, 12B and 12C is a Honda® type cap that can have a circular top 38, annular skirt 39 with generally cylindrically shaped outer surface 88, and annular edge 89 at the interface between top 38 and skirt 39. Cap 19A includes bayonet mount projections 86, 87 that interlock with a bayonet type flange (not shown on tank 14). Cap 19A can have gasket 95. Such an interlocking arrangement between projections 86, 87 and bayonet type flange on a fuel tank is known in the art (see for example small (e.g. 5 hp or 13,238 kilojoules) engines sold under the marks Briggs®, Honda®, and Kawasaki®.

FIGS. 13A, 13B and 13C show a Briggs® type cap arrangement. Cap 19B has top 90, annular skirt 91 that joins top 90 at annular edge 92. Projections 93, 94 connect to fuel tank 14 at a filler flange having a bayonet type mount. Cap 19B has gasket 95.

In FIGS. 12A, 12B and 12C there can be seen magnetic switch 28 (FIG. 12A) used with cap 19B, the use of a photoelectric switch at opening 66 (FIG. 13B) and the use of appendage 46 (FIG. 12C) for use with button switch 48. In FIGS. 13A, 13B and 13C there can be seen magnetic switch 28 (FIGS. 12A), opening 66 with reflector 65 as part of a photoelectric switch, and (in FIG. 12C) an appendage 46 for use with button switch 48.

FIGS. 12A, 12B, 12C 13A, 13B and 13C illustrate that a bayonet type filler cap and tank flange arrangement could be used with any of the embodiments of FIGS. 1–11.

Figures 14, 15:
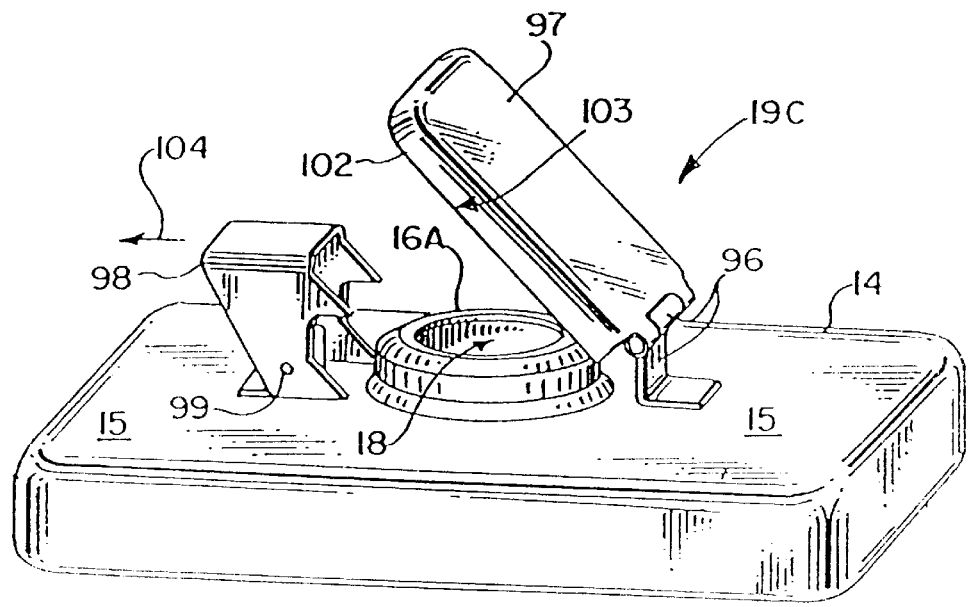
FIGS. 14–15 are perspective views of a hinged filler cap construction that can be used with the embodiment of FIGS. 1–11, showing closed and open positions respectively of the filler cap.

In FIGS. 14 and 15 there is shown a hinged filler cap 19C arrangement that can be used with any of the embodiments of FIGS. 1–11. Hinge 96 supports spring loaded cap 97 that automatically springs open to the open position of FIG. 14 when spring loaded latch 98 is moved away from cap 97 in the direction of arrow 104. Latch member 98 is pivotally mounted to tank surface 15 at pivot 99. A pair of sears 100 normally hold cap 97 in the closed position of FIG. 15. When the cap 97 is closed, sears 100 are engaged and latch 98 pushed away in the direction of arrow 104 until cap 97 closes fully upon flange 16A at which time sears 100 engage and hold cap 97. This general concept of a cap 97, hinge 96, latch 98 and flanged opening 16A, 18 is known and commercially available. Cap 97 has flat top 101, skirt 102 and skirt outer surface 103.

Following the teachings of the present invention, cap 97 could carry a magnet 25 that cooperates with switch 28 as in FIGS. 1–3. The cap 97 could carry a projection or appendage 46 as with the embodiment of FIGS. 4, 5A and 5B that cooperates with button switch 48. The cap 97 could also carry reflector 66 in opening 65 for use with photo electric switch 61 as in FIGS. 6–7.

Any of the cap constructions shown in FIGS. 12A, 12B, 12C, 13A, 13A, 13B and 13C or 14–15 can be used in combination with the micro switch arrangement of FIGS. 8–11.

Figure 16:
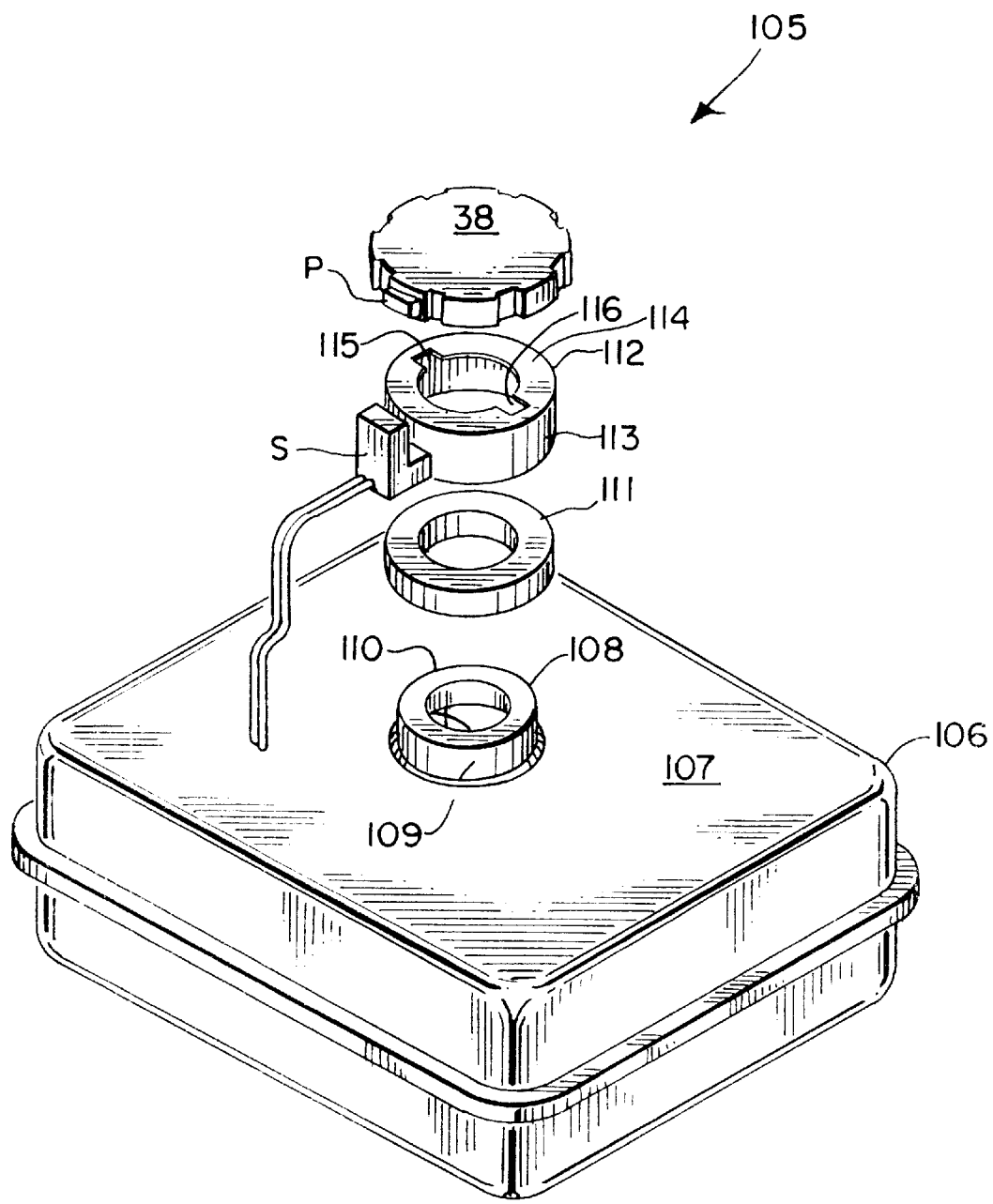
FIG. 16 is an exploded view of a fifth embodiment of the apparatus of the present invention.

FIG. 16 shows a fifth embodiment of the apparatus of the present invention designated generally by the numeral 105. In FIG. 16, fuel tank 106 has an upper surface 107 with a fuel filler neck 108. In the embodiment of FIG. 16, a fuel filler neck 112 can be added to the existing fuel filler neck 108 on tank surface 107. As an option, an adapter 111 can be placed in between the permanent fuel filler neck 108 of tank surface 107 and the retrofitted fuel filler neck 112. The adapter 111 can be a cylindrically shaped or donut shaped fitment or shim that fits in between the side wall 109 of filler neck 108 and the new filler neck 112.

Filler neck 108 has an annular shoulder 110 that surrounds a central opening through which fuel can be added to the tank surface 107. The new filler neck 112 has a side wall 113 and an upper annular shoulder 114 that carries a pair of spaced apart slots 115, 116. These slots 115, 116 receive projections 86, 87 of the fuel filler cap 38 shown in FIGS. 12A, 12B, 12C or the filler cap 90 shown in FIGS. 13A, 13B, 13C.

Figure 17:
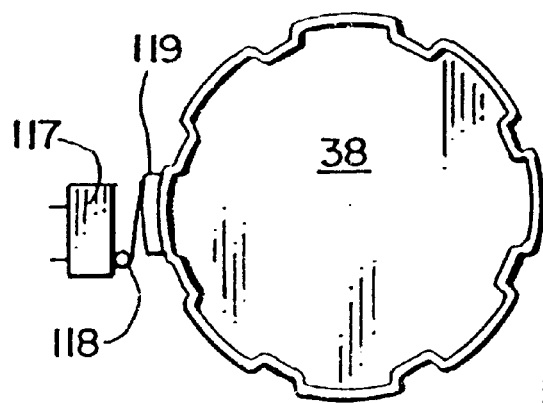
FIG. 17 is a fragmentary plan view of the fifth embodiment of the apparatus of the present invention showing a micro switch type switch arrangement.
Figure 18:
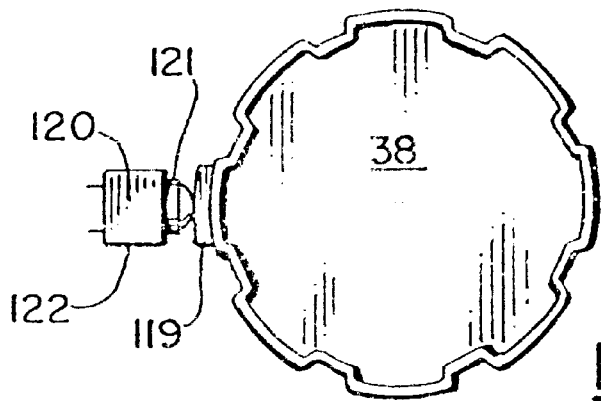
FIG. 18 is a fragmentary plan view of the fifth embodiment of the apparatus of the present invention shown with a plunger switch type switch arrangement.
Figure 19:
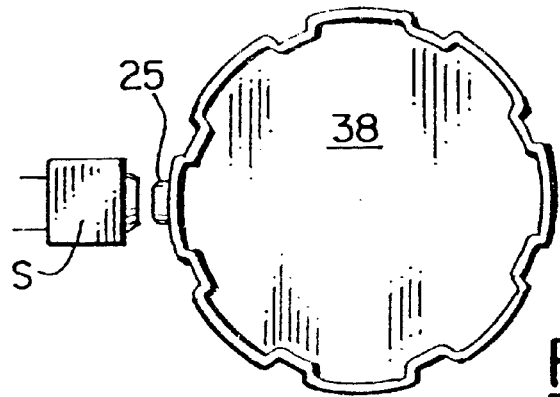
FIG. 19 is a fragmentary plan view of the fifth embodiment of the apparatus of the present invention shown with a magnetic switch, proximity switch, or optical switch arrangement.

The switch S in FIG. 16 schematically represents any of the selected switches that are discussed herein with respect to the embodiments of FIGS. 1–15, or any of the switches shown in FIGS. 17–19. Similarly, the projection P in FIG. 16 represents the portion of an overall switch arrangement that is carried at the periphery of a cap 19, 38 or 90, for any of the embodiments of FIGS. 1–15 or 17–21B.

In FIG. 17, a micro switch 117 is shown that cooperates with a projection 119 carried by cap 38 at the periphery of cap 38. The micro switch 117 has an arm 118 that is depressed in order to close the switch when the cap 38 is in a fully closed position engaging a fuel filler neck such as 112 or 16.

In FIG. 18, a plunger type switch arrangement is shown that includes a plunger type switch 120 having a housing 122 that carries a plunger 121. The plunger 121 closes relative to the housing 122 when it is depressed by projection 119. The projection 119 is carried at the periphery of cap 38 or any of the other fuel filler caps disclosed herein when the cap 38 is in its fully closed position. The switch 120 opens to shut down the engine when the projection 119 is moved away from plunger 121.

In FIG. 19, a projection 25 at the periphery of cap 38 can be a portion that cooperates with a magnetic switch, proximity switch, or optical switch, designated generally by the letter S in FIG. 19.

Figure 20A:
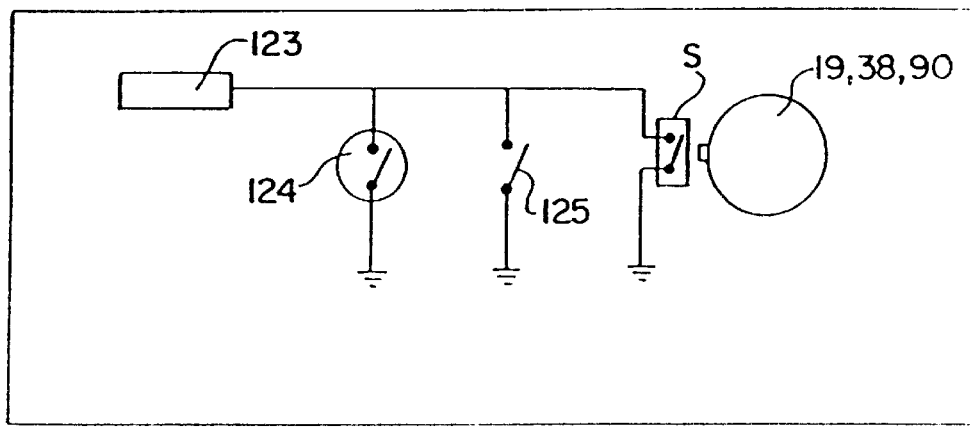
FIGS. 20A–20B are schematic wiring diagrams of the fifth embodiment of the apparatus of the present invention respectively showing ignition system on and ignition system off wiring diagrams.
Figure 20B:
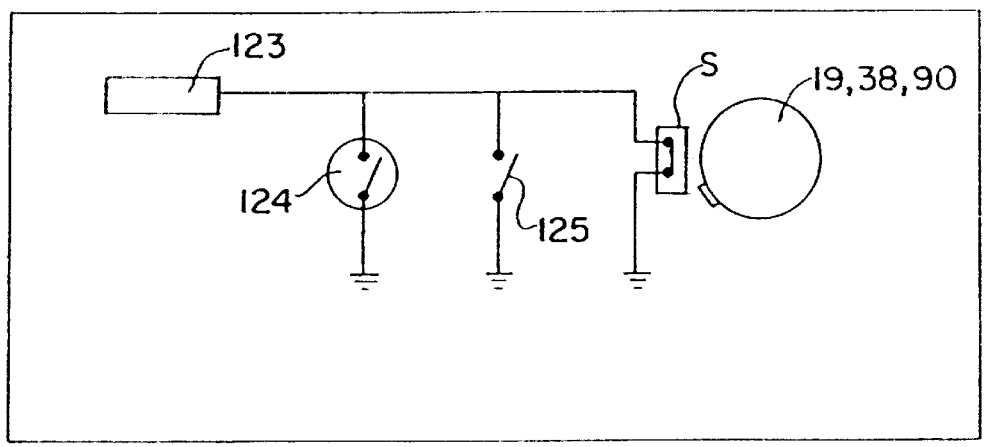

In FIGS. 20A and 20B, there is shown a wiring diagram for a ground to shut down arrangement. In FIG. 20A, an ignition system is indicated by the numeral 123 and key switch by the numeral 124. The numeral 125 indicates schematically any other ignition shut down switch. In FIG. 20A. All of the switches shown in FIG. 20A are wired and parallel to each other. If any switch is closed in FIG. 20A, he engine will not run.

In FIG. 20B, the ignition system is shown in an off position. The fuel cap switch S is closed when the cap 19, 38 or 90 is not secured to the tank, and the engine will not run. The fuel cap system shown in FIG. 20B will work on any type of ignition system/shut off system including magneto type, coil type, negative and positive ground, ground to run and ground to shut down.

Figure 21A:
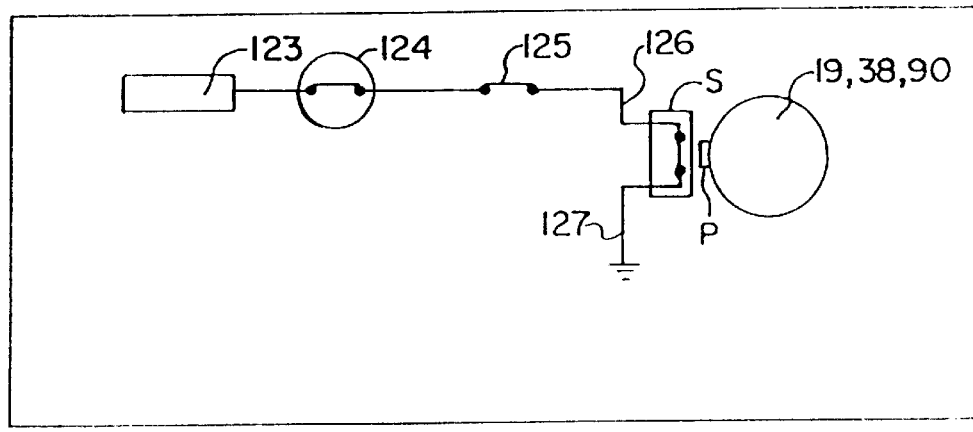
FIGS. 21A–21B are alternate circuit drawings showing an ignition system for the present invention in respective "on" and "off" positions.
Figure 21B:
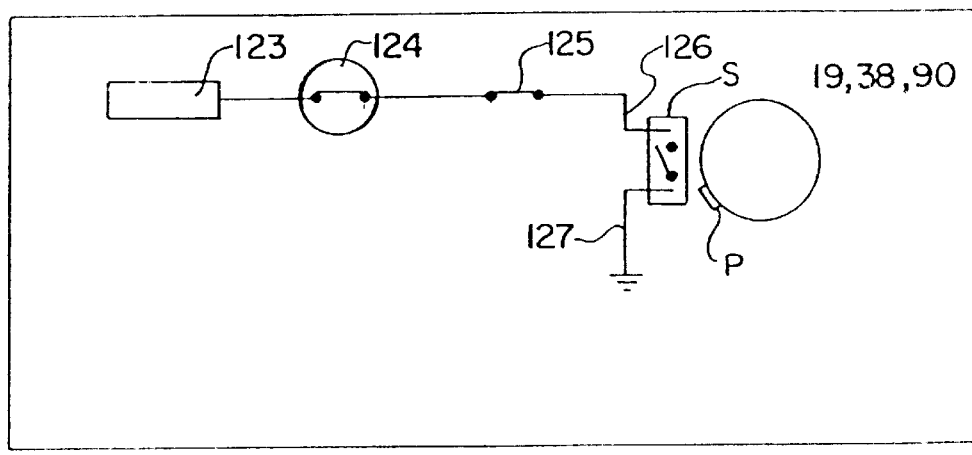

In FIGS. 21A and 21B, there is shown a wiring diagram for a ground to run arrangement. In FIG. 21A, an ignition system is indicated by the numeral 12S and key switch by the numeral 124. The numeral 125 indicates any other ignition shut down switch. In FIG. 2/4 the system is shown in an off position. All off the switches are wired in series to each other. If any switch is opened the engine will not run. Removing fuel cap 19, 38 or 90 opens the switch S so that the engine will not run.

In FIG. 21B, the ignition system is shown in an off position. The fuel cap switch S is open when cap 19, 38 or 90 is not secured to the tank, and the engine will not run. The fuel cap system shown in FIG. 20A and 20B will work on any type of ground to run, ignition system/shut off system including magnet type, coil type, negative and positive ground.

Figure 24:
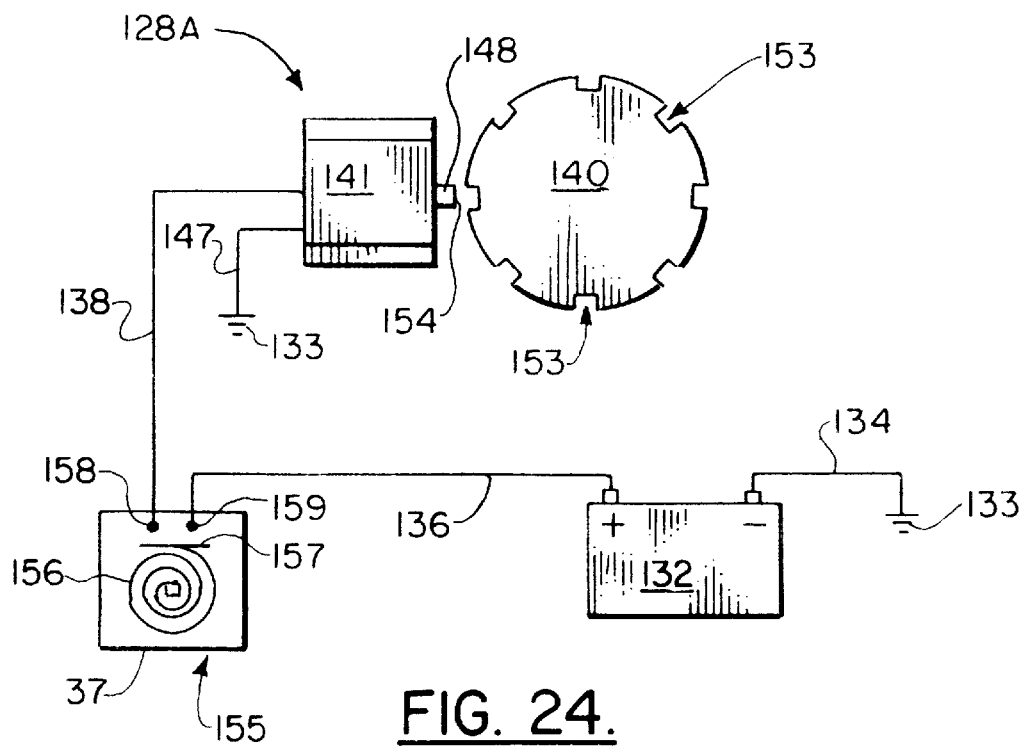
FIG. 24 is a schematic top view of the sixth embodiment of the apparatus of the present invention showing the cap in an unlocked position.

FIGS. 22–24 show a sixth embodiment of the apparatus of the present invention designated generally by the numeral 128 in FIG. 22. Safety fuel tank and cap apparatus 128 in FIG. 22 is used with an internal combustion engine 129, such as a lawn mower engine having a starter 130, starter solenoid 131, and powered by battery 132.

Engine 129 has a fuel tank 139 that is often closely positioned to the engine block 129A of engine 129. Fuel tank 139 has an opening for enabling fuel to be added, and a fuel filler closure cap 140 that can seal the fuel tank opening. This overall arrangement of engine 129, battery 132, fuel tank 139 is the same for all embodiments.

Wiring interconnecting battery 132, engine 129 and the remaining components of the apparatus 128 of the present invention are shown in FIG. 22. Such wiring includes ground 133 that communicates with battery 132 via battery cable 134 and cable 135 that communicates with starter solenoid 131. Cable 136 extends between battery 132 and heat sensor 137. A cable is also provided that links starter 130 and starter solenoid 131.

Cable 138 extends between heat sensor 137 and actuator 141. Actuator 141 is preferably mounted upon fuel tank 139 next to fuel filler cap 140 as shown in FIG. 22. The actuator 141 defines a locking mechanism that prevents the filler cap 140 from being removed when the engine temperature is above a predetermined temperature that is near or below the ignition temperature of the fuel (or fuel vapor) in and around tank 139.

Actuator 141 includes switch housing 142 having a housing interior 143 that contains plunger 148, as shown in FIGS. 2A and 23B. Wire lead 144 is contained within cable 138 for supplying electrical power to actuator 141 as shown in FIGS. 23A and 23B. Wire lead 144 connects to coil 146 at terminal 145. Coil 146 is preferably grounded, e.g. with wire lead 29 to switch housing 142.

Plunger 148 moves between locked and unlocked positions. FIG. 23A shows the unlocked position of plunger 148. FIG. 23B shows the locked position of plunger 148. Plunger 148 is mounted within housing interior 143 through an opening at the center of coil 146. One end of plunger 148 is supported by flange 149 and spring 150. The other end of plunger 148 is supported by housing 142 at the opening through which plunger 148 extends. The actuator 141 functions as a solenoid to move the plunger 148 between locking and unlocking positions. Spring 150 normally holds plunger 148 in the unlocked position of FIG. 23A. The spring 150 extends between anchor plate 151 and plunger 148 at flange 149.

Cap 140 has a plurality of circumferentially spaced radially extending recesses 153, each sized and shaped to form a connection with plunger 148 at end portion 154. In FIG. 23B, arrows 152 indicate the movement of plunger 148 from an unlocked position to a locked position. During operation, heat sensor 137 monitors the temperature of engine 129. When the temperature of engine block 129A of engine 129 reaches a predetermined temperature that is at or near the ignition temperature of gasoline, heat sensor 137 sends an electrical signal via wire lead 144 to actuator 141 activating coil 146 to move plunger 148 to the locked position of FIG. 23B. When the temperature sensed by heat sensor 137 drops below a predetermined acceptable temperature value, the heat sensor 137 halts the electrical flow to actuator 141 so that return spring 150 moves plunger 148 to the unlocked position of FIG. 23A.

Figure 25:
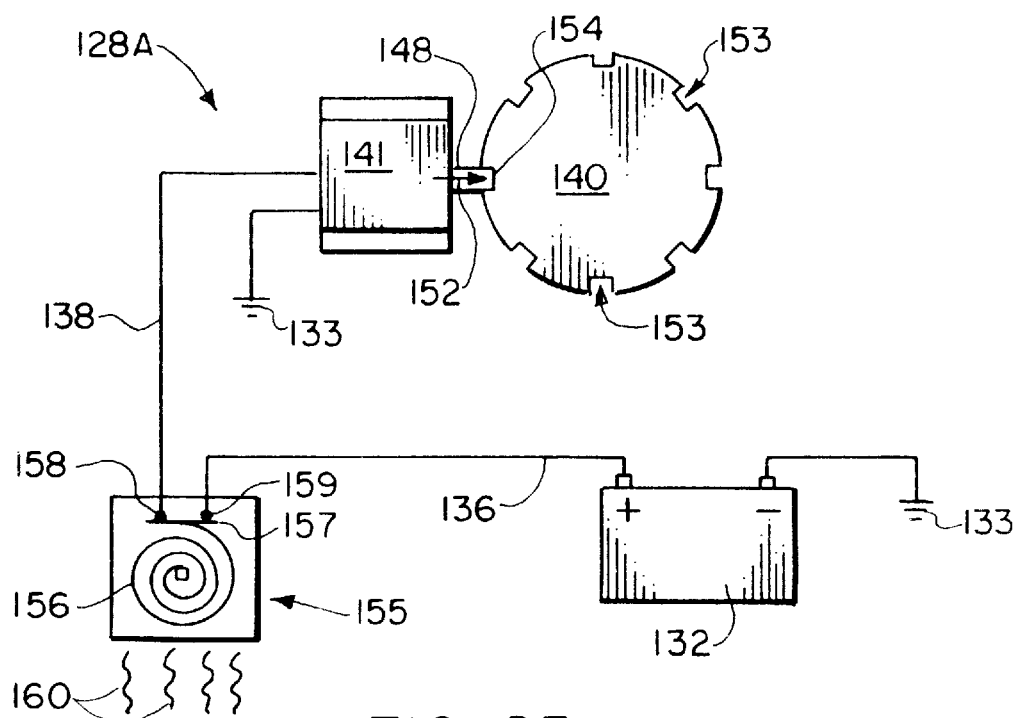
FIG. 25 is a schematic top view of the sixth embodiment of the apparatus of the present invention showing the cap in a locked position.

FIGS. 24 and 25 show the sixth embodiment 128A of the apparatus of the present invention using switch 155. Switch 155 is in the form of a coil 156 having contact bar 157. A pair of terminals 158, 159 are positioned next to contact bar 157 as shown in FIGS. 2A and 23B. When excessive heat, indicated by heat wave lines 160 in FIG. 25 is transferred to switch 155, coil 156 expands, pushing contact bar 157 into contact with terminals 158, 159. As the circuit is closed, battery 132 is able to supply power to actuator 141, closing a circuit activating plunger 148 and engaging the projecting portion 154 into a recess 153 of cap 140 as indicated by arrow 152 in FIG. 25.

Figure 26A:
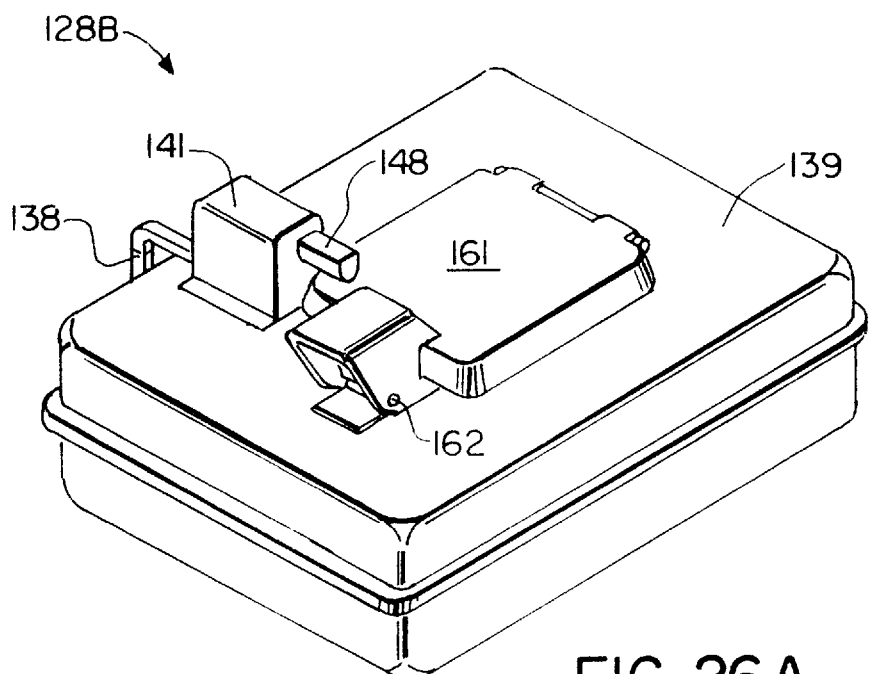
FIGS. 26A–26B are perspective views of a seventh embodiment of the apparatus of the present invention.
Figure 26B:
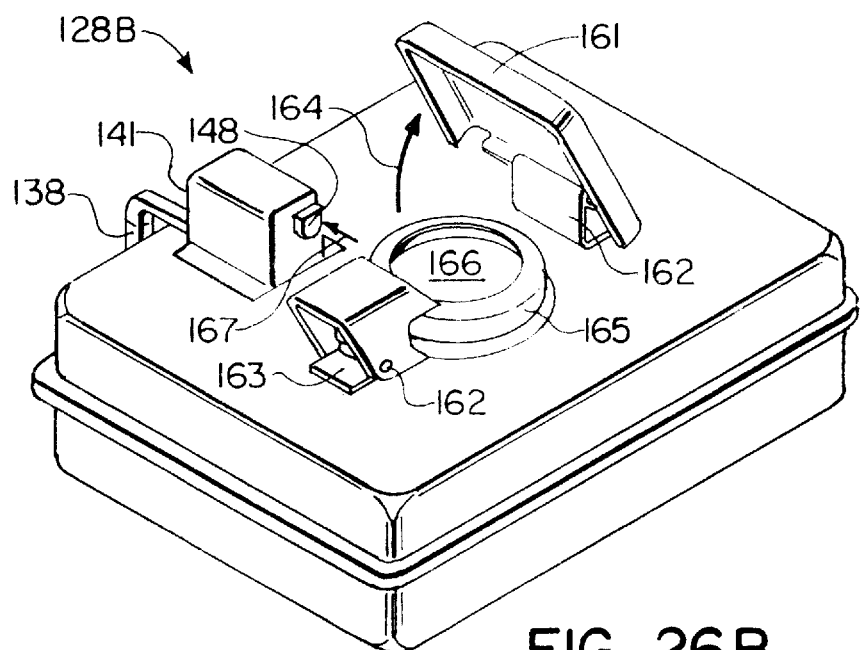

Another (seventh) embodiment of the apparatus 128B of the present invention is shown in FIGS. 26A and 26B. In FIGS. 26A and 26B, cap 161 is mounted upon hinge 162 to move between open and closed positions as indicated by arrow 164 in FIG. 26B. Latch 163 can be used to latch cap 161 in the closed position of FIG. 26A. The latch 163 can be depressed to open cap 161 as shown in FIG. 26B. Cap 161 closes opening 166 that is surrounded by filler neck 165. In the embodiment of FIGS. 26A and 26B, the actuator 141 and its plunger 148 are operated in the same fashion as shown and described herein relative to FIGS. 23A and 23B. However, in FIGS. 26A and 26B, the plunger 148 simply extends over the top of cap 161 preventing it from opening. In FIG. 26A, when the plunger 148 is retracted as indicated by arrow 167, cap 161 can be opened.

Figure 27:
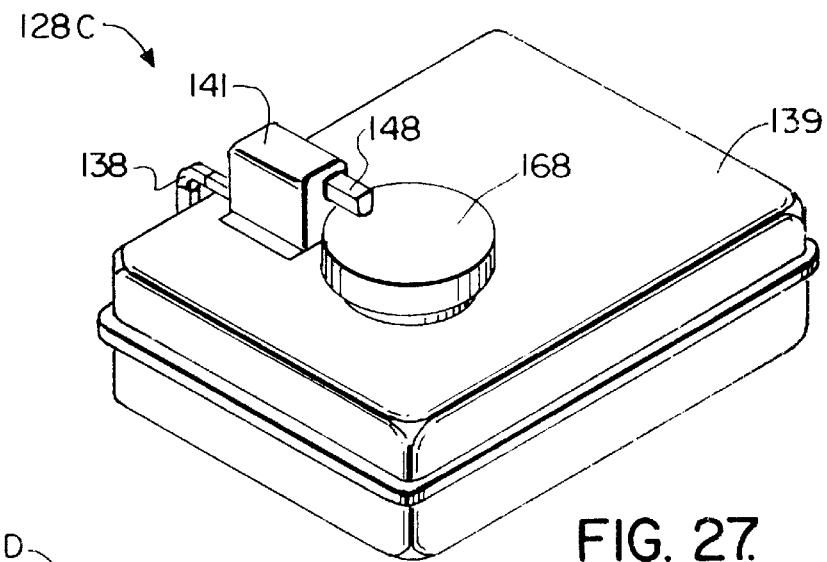
FIG. 27 is a perspective view of an eighth embodiment of the apparatus of the present invention.

In the embodiment of FIG. 27, apparatus 128C includes cap 168 which is internally threaded and having threads that engage the external threads of a filler neck on fuel tank 139. As with the embodiment of FIGS. 26A and 26B, the embodiment of FIG. 27 extends the plunger 148 into a locking position to prevent a user from unthreading the cap 168 from its filler neck until the engine 11 has cooled below the desired temperature.29

Figure 28A:
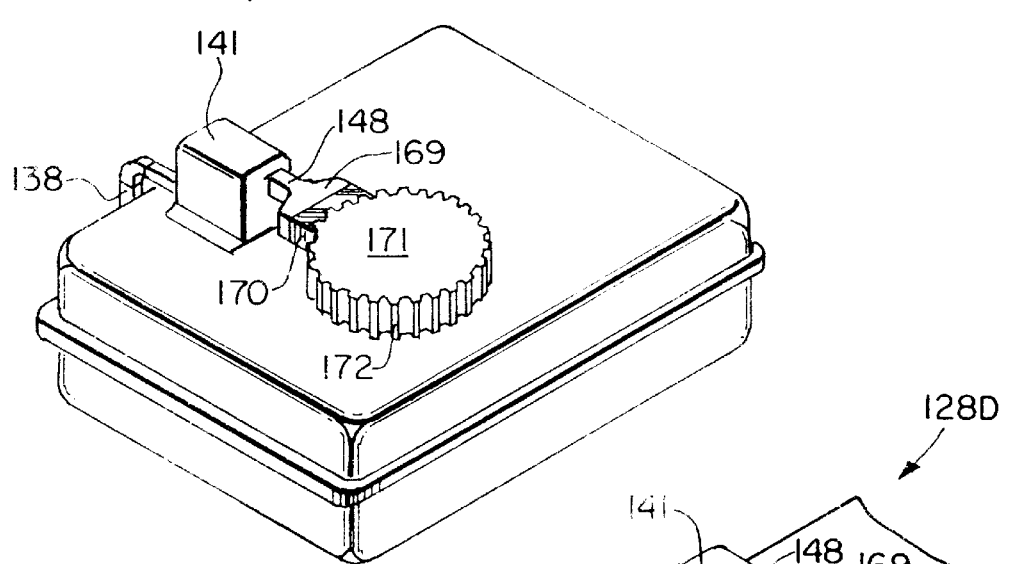
FIGS. 28A–28B are perspective fragmentary views of a ninth embodiment of the apparatus of the present invention.
Figure 28B:
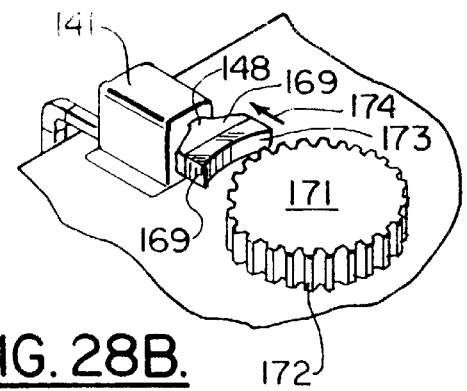

In FIGS. 28A and 28B, another embodiment of the apparatus of the present invention is shown, designated as 128D. In FIGS. 28A and 28B, the plunger 148 carries an enlarged end portion 169 having a rubber or resilient contact member 170. The rubber contact member 170 engages ribbed cap 171. The ribs 172 are sharp so that they are gripped by the resilient or rubber contact member 170 that conforms generally to the ribs 172.

The contact member 170 has a concave surface 173 that generally fits the contour of the external surface of the cap 171. In FIG. 28B, arrow 174 indicates movement of plunger 148 to an unlocked position.

Figure 29:
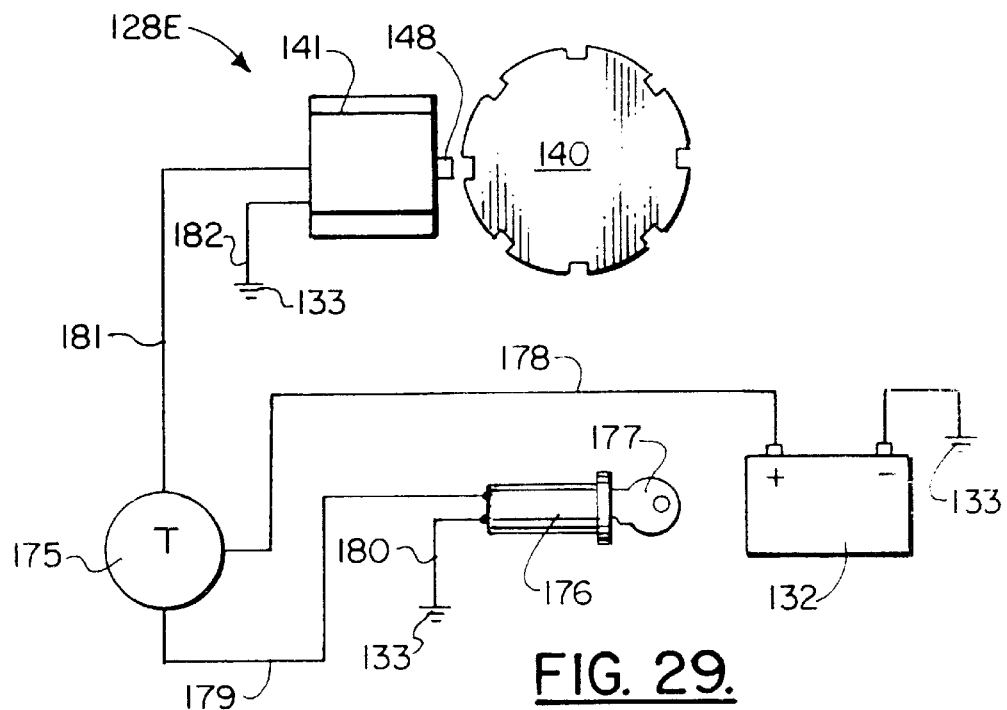
FIG. 29 is a schematic view of a tenth embodiment of the apparatus of the present invention.

In the embodiment of FIG. 29, the apparatus 128E includes a timer arrangement used in concert with the actuator 141 of FIGS. 23A and 23B for locking fuel cap 140 until the temperature of the engine block 129A of engine 129 has cooled. In FIG. 29, a timer 175 locks the cap 140 until a sufficient amount of time has lapsed (2–5 minutes) so that the cap can be removed without a danger of explosion or fire. In FIG. 29, key switch 176 has key 177 for operating engine ignition and timer 175. When key 177 is turned to the "on" position, a timer circuit activates actuator 141 so that plunger 148 is moved to the locked position, and remains locked as long as the key is in the on position. When key 177 is turned to the "off" position, timer 175 is activated to keep plunger in locked position. After a desired time interval of two to five minutes, for example, timer 175 halts the flow of electricity from battery 132 to actuator 175 so that its return spring 150 (see FIGS. 23A–23B) moves the plunger 148 to the unlocked position shown in FIG. 29. Wire cables 178–182 are shown in FIG. 29 interfacing battery 132, lock 176, timer 175 and actuator 141.

Figure 30:
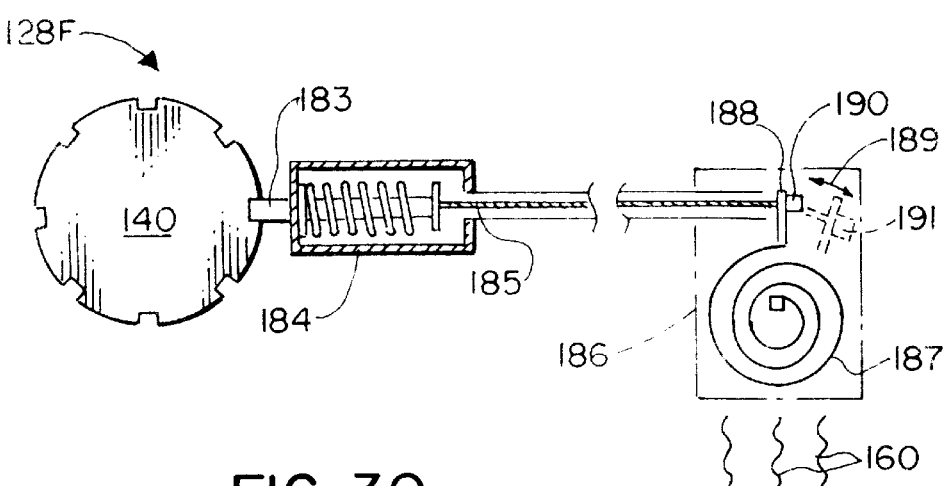
FIG. 30 is an schematic view of an eleventh embodiment of the apparatus of the present invention.

In FIG. 30, the apparatus 128F includes plunger 183 that is manually operated using heat sensitive coil 187. Plunger 183 is mounted in switch housing 184. Plunger 183 is attached to cable 185. The cable 185 extends out of the switch housing 184 to engage radial arm 188 of coil 187. Coil housing 186 contains coil 187 and also provides a stop for limiting movement of free end 190 of radial arm 188. Arrow 189 in FIG. 30 indicates the movement of radial arm 188 and its free end 190 between a locking position shown in hard lines in FIG. 30 and an unlocked position shown in phantom lines in FIG. 30.

In FIG. 30, the heat indicated by waves 160 causes coil 187 to expand to the locked position. When the heat of the engine reduces to an acceptable temperature level, coil 187 cools and contracts, moving radial arm 188 to the unlocked position shown in phantom lines in FIG. 30, and pulling cable 185 and plunger 183 with it.

In FIGS. 31–46, a twelfth embodiment of the apparatus of the present invention is shown, designated generally by the numeral 192. In the embodiment of FIGS. 31–46, safety fuel tank and cap apparatus 192 features a multi-position key switch arrangement 193 that interacts with cap 202 that is notched and which interacts with a actuator 200 having a projection 203, the cap 202 and switch 193 arrangement is similar to that shown in the embodiment of FIGS. 24 and 25.

Key switch 193 includes multiple key positions including an "unlocked" position 194, "off" position 195, "on" position 196, and "start" position 197. This same key switch 193 can be used in each of the illustrations of FIGS. 31–46.

Battery 198 schematically represents the battery of the vehicle that has an engine E with a fuel tank and cap 202 such as the battery 198 of a tractor, go cart, lawnmower, ATV, blower, weed trimmer, powered lawn equipment or the like. Battery 198 communicates with key switch 193 via lead 204. Battery 198 is grounded at ground lead 205.

Figure 31:
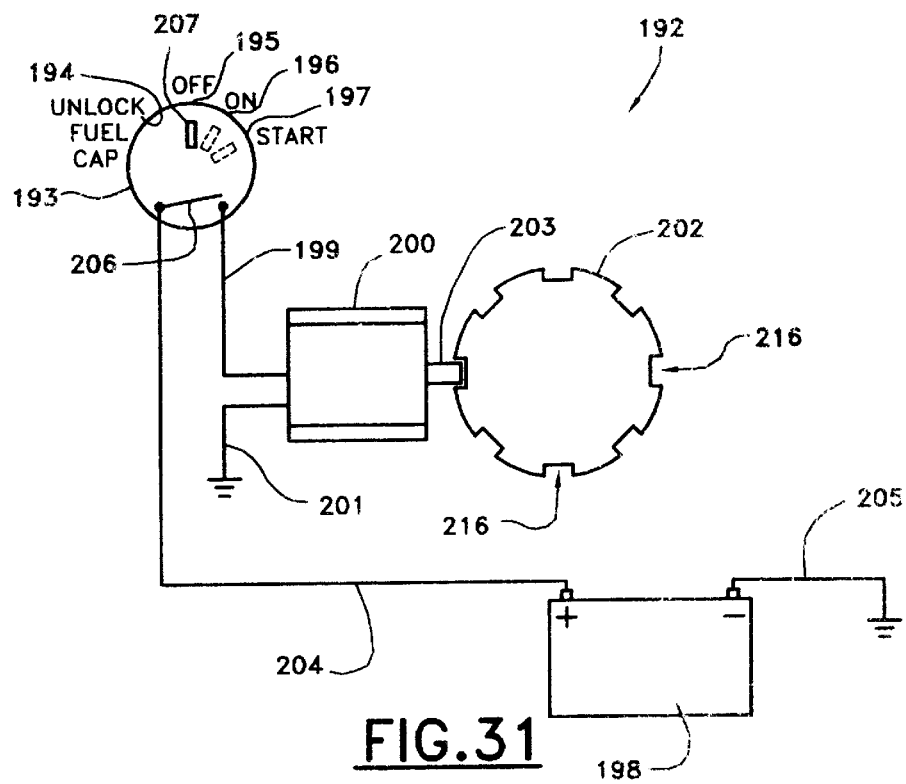
FIG. 31 is a schematic view of a twelfth embodiment of the apparatus of the present invention.

Actuator 200 is interfaced with key switch 193 via lead 199. Actuator 200 can be grounded at 201. Actuator 200 has projection 203 that can engage any of the peripheral notches 216 of cap 202 to thereby lock and prevent removal of cap 202. Switch member 206 of key switch 193 is movable between open and closed positions, the open position, for example, being shown in FIG. 31 and the closed position in FIG. 32. Key switch 193 features a removable key 207 that must be inserted into the key switch 193 in order to access the different positions, including "unlock" 194, "off" 195, "on" 196, and "start" 197. In FIG. 31, the safety fuel tank and cap apparatus 192 shows the fuel cap 202 in a locked position when the key 207 is in an off position 195. Similarly, the fuel cap 202 is locked in FIG. 31 if the key is in either the "on" or "start" position. In FIG. 31, the projection 203 engages a recess 216 of cap 202 in either of the positions 195 (off), 196 (on), or 197 (start).

Figure 32:
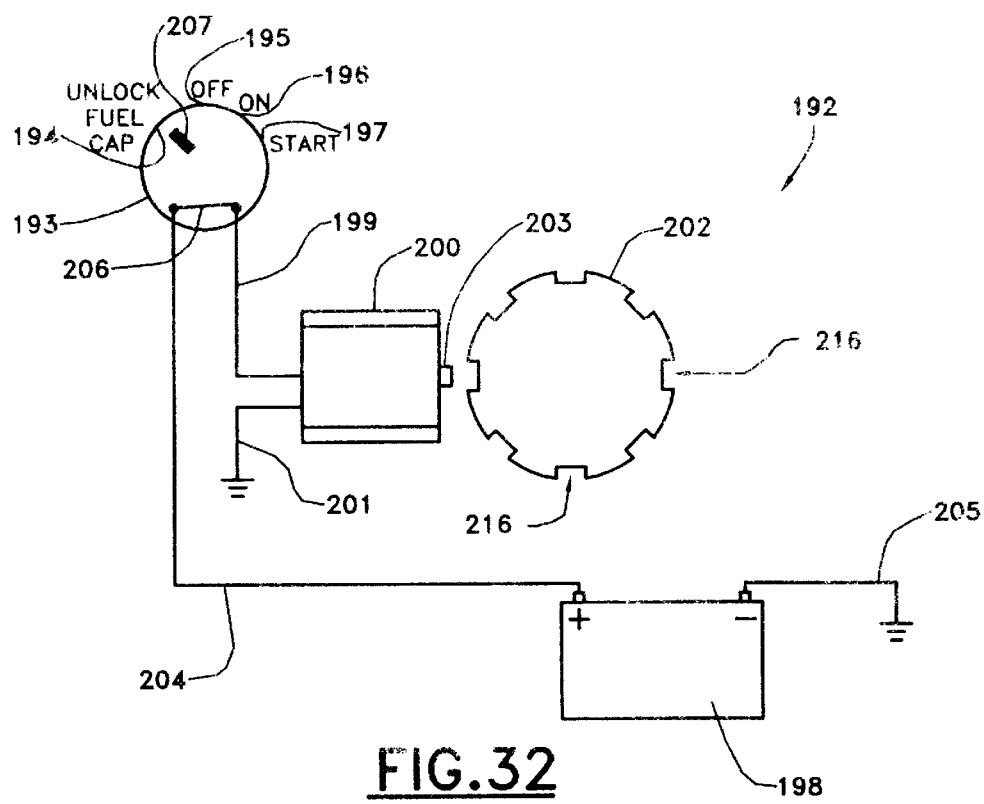
FIG. 32 is a schematic view of a twelfth embodiment of the apparatus of the present invention.

In FIG. 32 key 207 has been moved to the "unlock fuel cap" position 194. In this position, the key 207 cannot be removed from the key switch 193. However, in this position the projection 203 is withdrawn into actuator 200 and away from the recesses 216 of cap 202. In this position, the fuel cap 202 can be removed.

Figure 33:
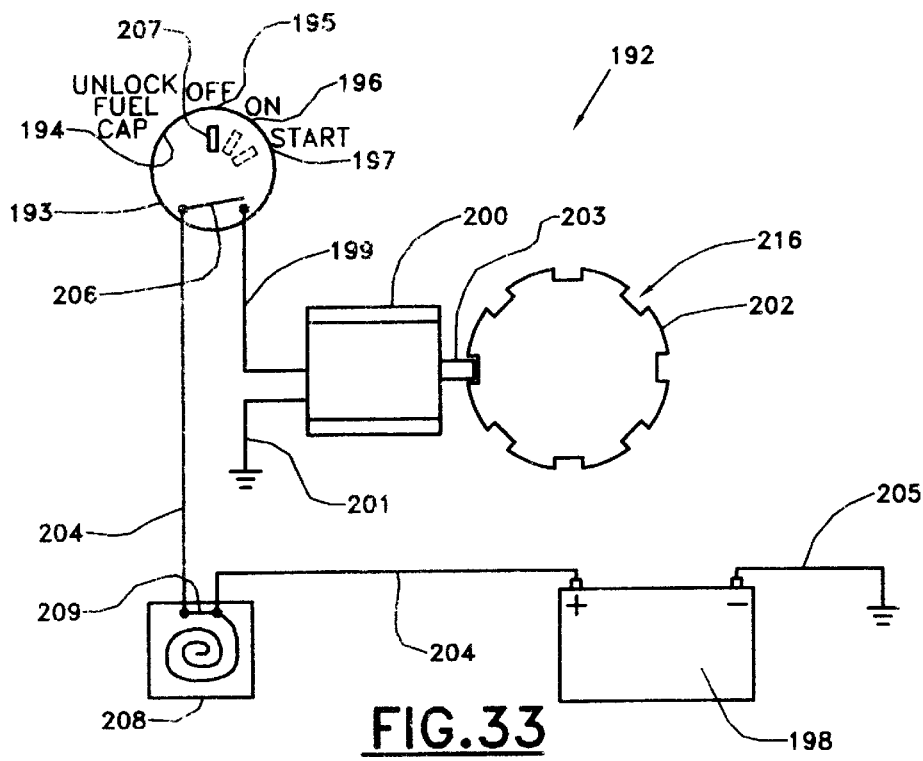
FIG. 33 is a schematic view of a twelfth embodiment of the apparatus of the present invention shown with optional heat sensor.

FIG. 33 shows the safety fuel tank and cap apparatus 192 wherein an optional heat sensor 208 has been included, having switch member 209. In FIG. 33, if the engine E is cooled to a temperature that will not produce a fire hazard, the temperature switch 209 closes as shown in FIG. 33 so that the switch member 209 closes the circuit from the battery 198 to the key switch 193. In FIG. 33, the key switch 193 is schematically shown as being in either the "off","on or start position. Therefore, the cap 202 is still locked by the actuator 200 projection 203 because of the position of the key.

Figure 34:
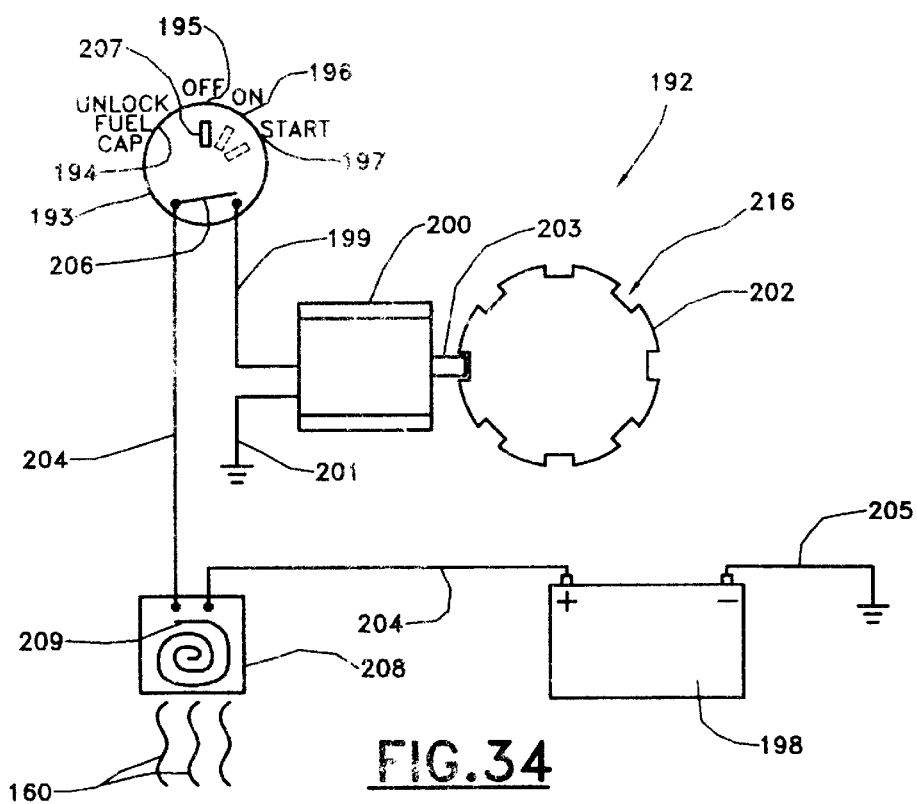
FIG. 34 is a schematic view of a twelfth embodiment of the apparatus of the present invention shown with optional heat sensor.

In FIG. 34, the heat sensor is shown in an engine still hot situation so that the switch member 209 has broken the circuit between the battery 198 and the key switch 193. If the engine is hot, temperature switch member 209 opens the circuit and the cap 202 is locked with projection 203. Even though the switch member 206 of the key switch 193 is in an unlocked position, the cap 202 can not be removed in FIG. 34. Thus, the heat sensor 208 in FIG. 34 provides an additional backup and safety feature to prevent removal of cap 202 if an the engine is still hot.

Figure 35:
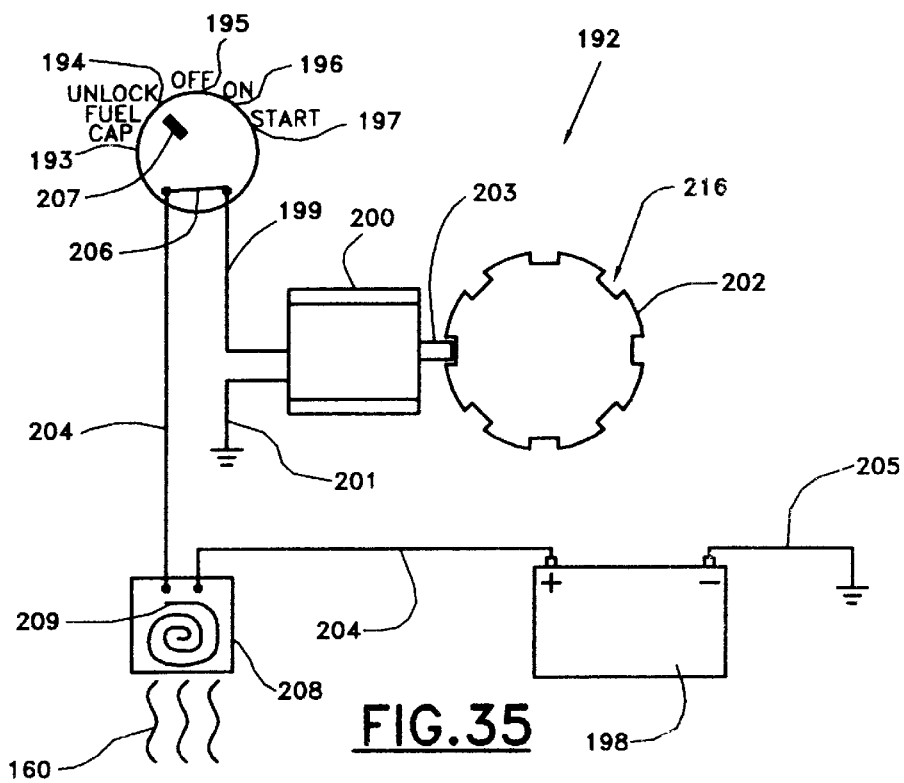
FIG. 35 is a schematic view of a twelfth embodiment of the apparatus of the present invention shown with optional heat sensor.

In FIG. 35, the key switch is shown in the unlocked fuel cap position 194. However, the engine E of the vehicle or implement is still hot as indicated by the heat waves 160. In this situation, the heat sensor 208 switch member 209 is open, interrupting the circuit between battery 198 and key switch 193. Therefore, even though the switch 193 is in the unlocked fuel cap 194 position, the cap 202 is locked because of the hot condition of the engine for the vehicle or implement.

Figure 36:
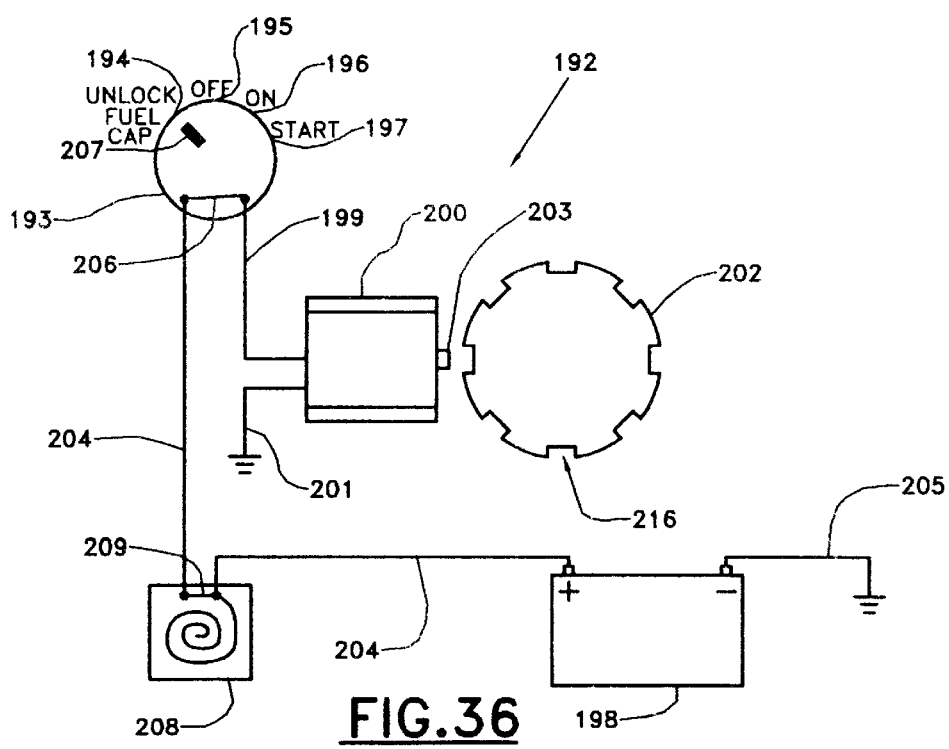
FIG. 36 is a schematic view of a twelfth embodiment of the apparatus of the present invention shown with optional heat sensor.

In FIG. 36, the engine E is cooled and the heat sensor 208 switch member 209 is in a closed position, closing the circuit from the battery 198 to the key switch 193. Additionally, the user has placed the key 207 in the unlocked fuel cap position 194. Since both the engine has cooled and the key switch 193 is in the proper position, the fuel cap 202 can be unlocked. As shown in FIG. 36, the projection 203 has been withdrawn from a recess 216 of cap 202.

Figure 37:
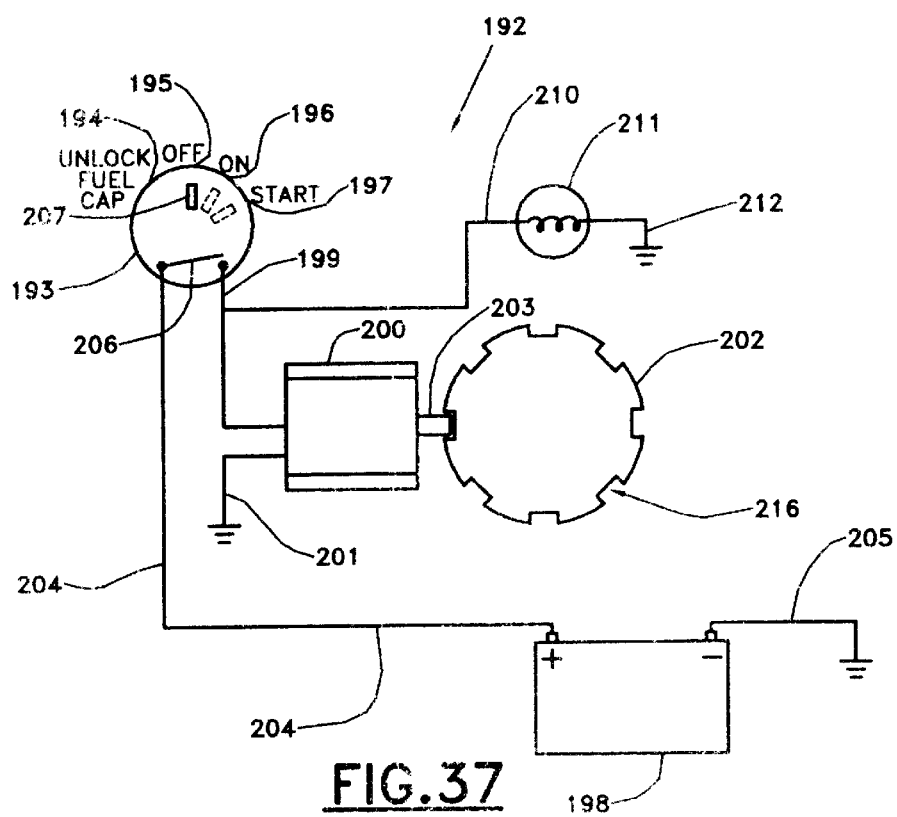
FIG. 37 is a schematic diagram of the twelfth embodiment of the apparatus of the present invention shown with optional indicator light.

In FIG. 37, the safety fuel tank and cap apparatus 192 is shown with an optional indicator lamp 211 connected to lead 199 with lead 210. The indicator light 211 is also grounded at 212. In FIG. 37, the key switch 193 can be placed in either an "off" 195, "on" 196, or "start" 197 position. The light 211 is not activated because in these three positions, the cap 202 cannot be opened. The projection 203 engages a recess 216 of cap 202 as shown. The indicator light 211 thus indicates that the apparatus 192 is not in the proper position for removal of the cap 202.

Figure 38:
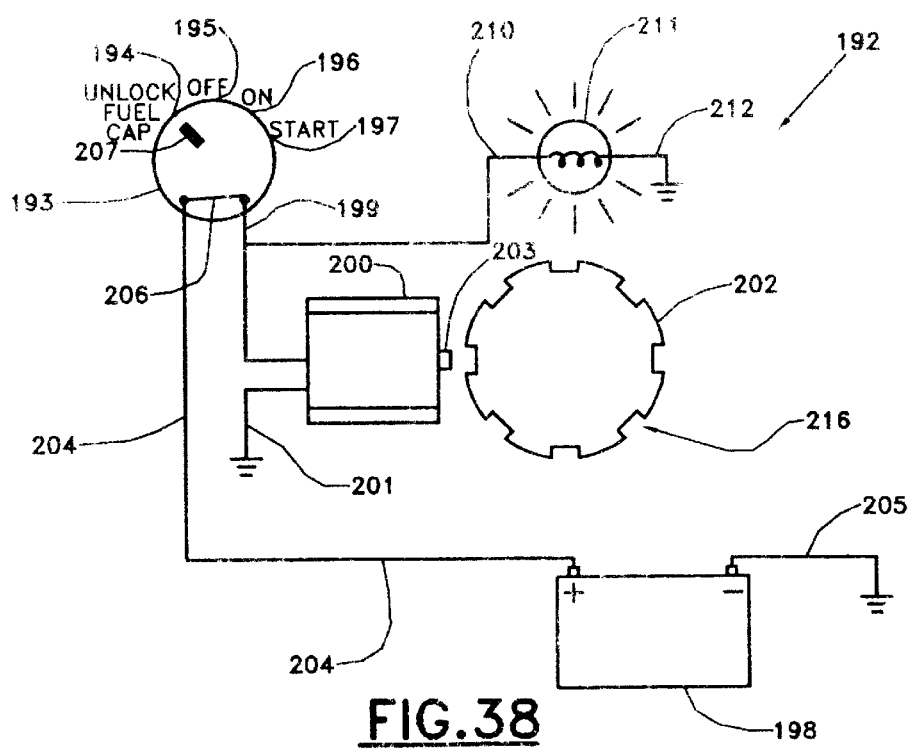
FIG. 38 is a schematic diagram of the twelfth embodiment of the apparatus of the present invention shown with optional indicator light.

In FIG. 38, the key 207 is in the unlocked fuel cap 194 position. The key cannot be removed in this position 194. Thus, the indicator light 211 has been illuminated to show that the cap 202 may be removed. In such a situation of FIG. 38, projection 203 has been withdrawn by actuator 200 from recess 216.

Figure 39:
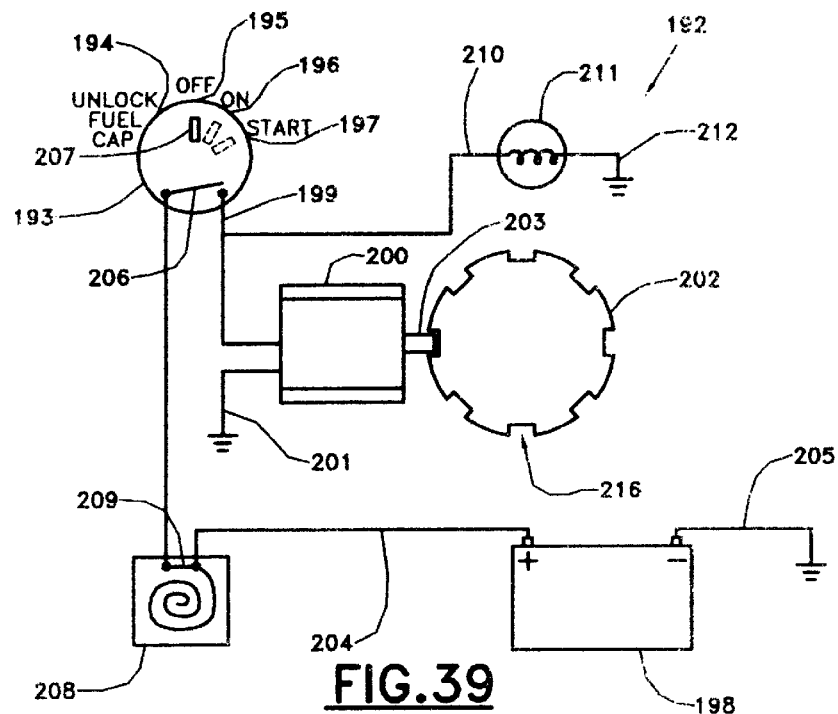
FIG. 39 is a schematic diagram of the twelfth embodiment of the apparatus of the present invention shown with both optional heat sensor and optional indicator light.

In FIG. 39, both a heat sensor 208 and indicator light 211 have optionally been provided to the safety fuel tank and cap apparatus 192. In FIG. 39, the engine E is cool as indicated by the closed position of switch member 209 of heat sensor 208. However, if the key switch is in either an "off" 195, "on" 196, or "start" 197 position, the cap 202 remains locked with projection 203 engaging a recess 216.

Figure 40:
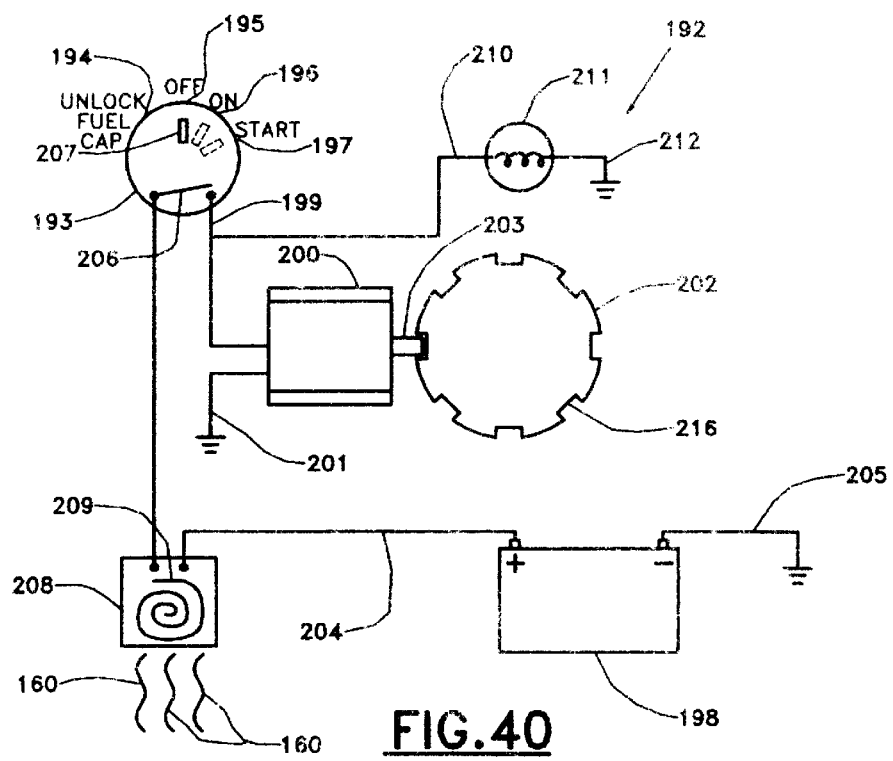
FIG. 40 is a schematic diagram of the twelfth embodiment of the apparatus of the present invention shown with both optional heat sensor and optional indicator light.

In FIG. 40, a hot engine condition is indicated by the heat waves 160 so that switch member 209 of heat sensor 208 is open, interrupting the circuit between battery 198 and key switch 193. Additionally, the key switch 193 is shown in an "off" 195, "on" 196, or "start" 197 position so that the switch member 206 is also open. Therefore, the indicator lamp 211 does not illuminate to indicate that the cap 202 can be removed. The cap 202 is locked as shown and the indicator light 211 is not activated.

Figure 41:
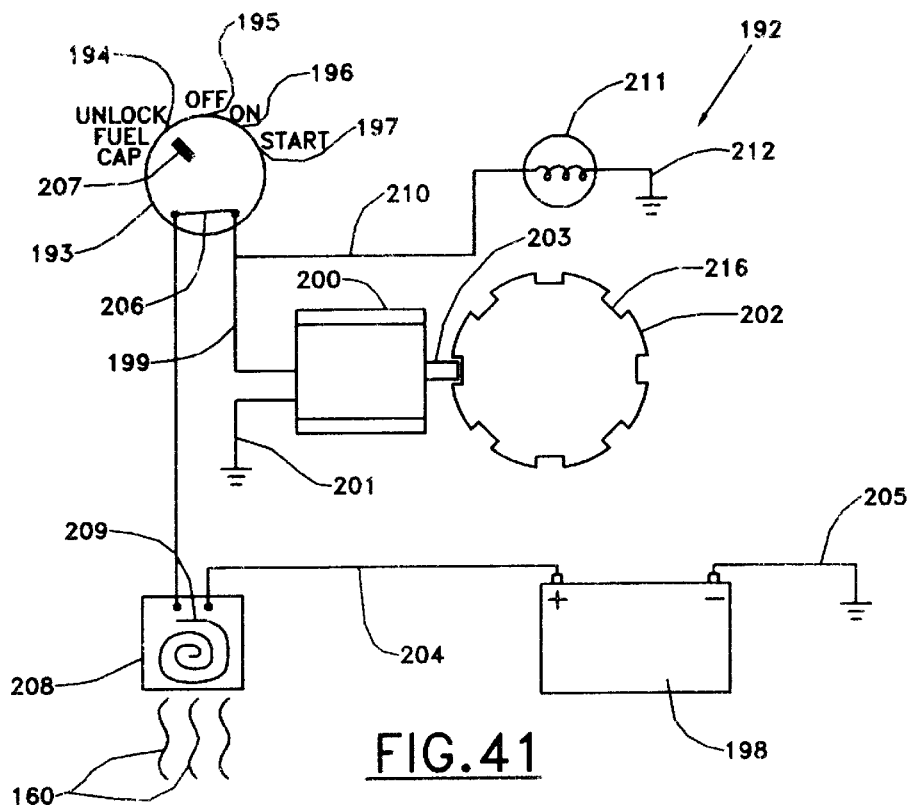
FIG. 41 is a schematic diagram of the twelfth embodiment of the apparatus of the present invention shown with both optional heat sensor and optional indicator light.

In FIG. 41, the engine is hot, as indicated by the position of switch member 209. Therefore, the cap is locked even though the switch 193 is in the "unlocked fuel cap" 194 position. Because the fuel cap 202 cannot be removed in this position, the light 211 is not illuminated.

Figure 42:
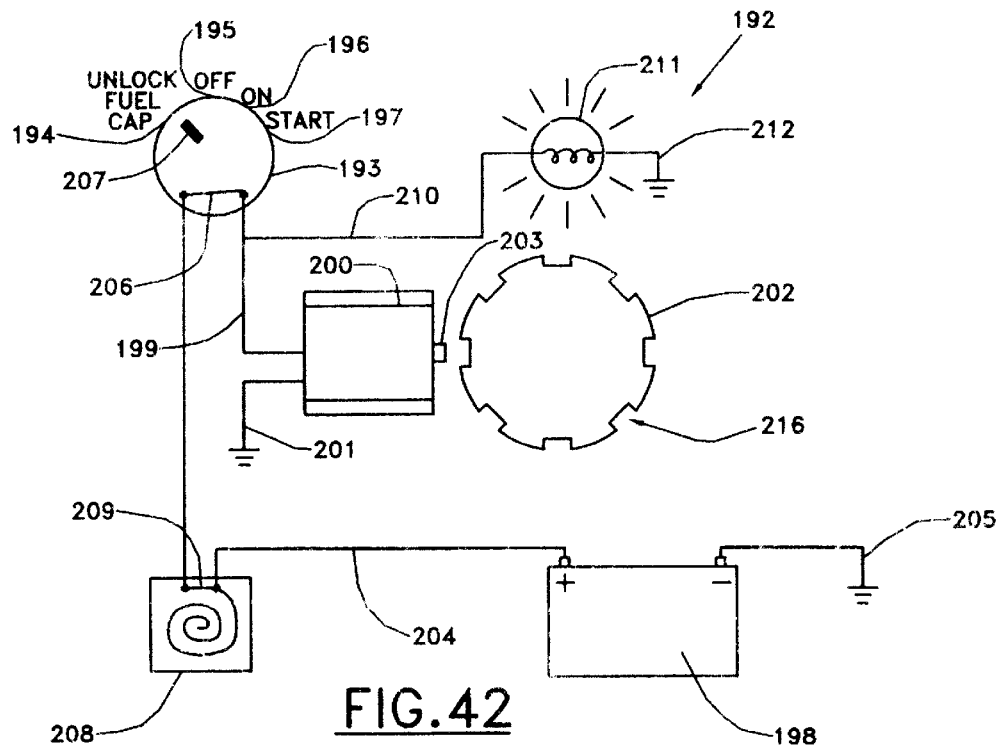
FIG. 42 is a schematic diagram of the twelfth embodiment of the apparatus of the present invention shown with both optional heat sensor and optional indicator light.

In FIG. 42, the switch position 209 indicates a cool engine temperature. Additionally, the key switch 193 is in the "unlocked fuel cap" 194 position. Because the engine is cool, the temperature switch 208 closes the circuit from the battery 198 to the key switch 193. Additionally, the switch 193 is in an unlocked fuel cap 194 position. The key 207 is preferably not removable from key switch 193 in this position 194. The indicator light 211 is activated to show that the cap 202 may be removed. As shown in FIG. 42, the projection 203 has been withdrawn from recess 216 of cap 202.

Figure 43:
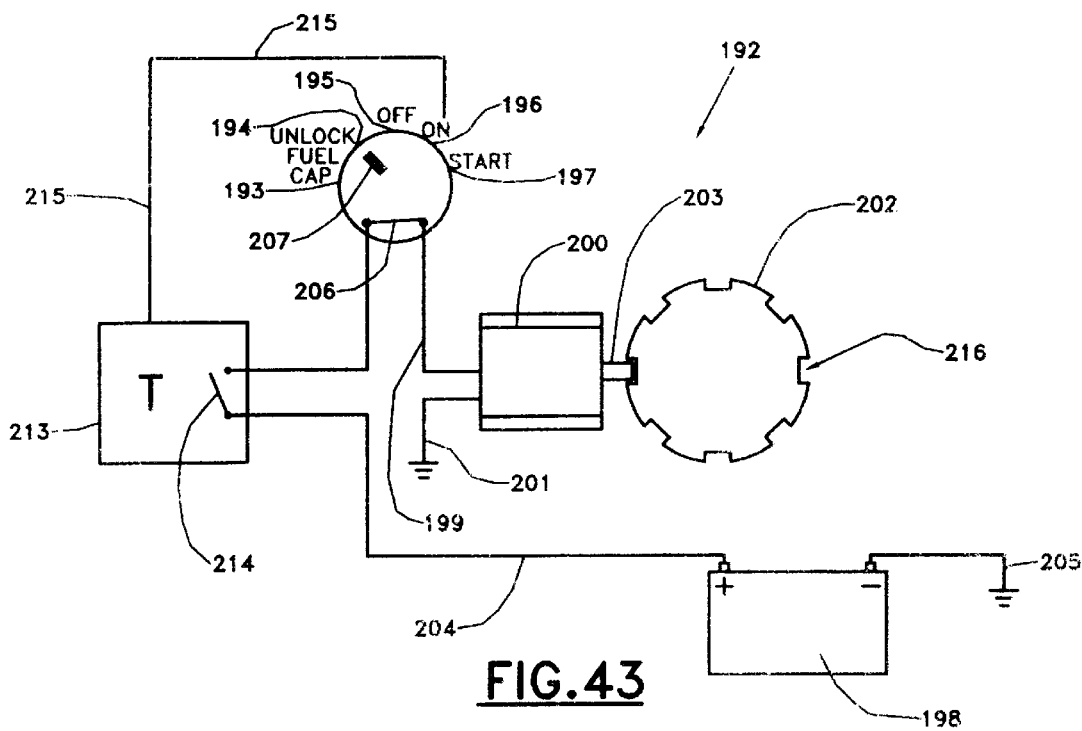
FIG. 43 is a schematic diagram of the twelfth embodiment of the apparatus of the present invention shown with optional timer.

FIG. 43 shows the safety fuel tank and cap apparatus 192 with an optional timer 213. Timer 213 has switch member 214 shown in an open position in FIG. 43, interrupting the circuit between battery 198 and key switch 193. In FIG. 43, the engine E has just been turned off, signaling timer 213 to open the circuit from battery 198 to key switch 193 until a predetermined time has elapsed. In FIG. 43, cap 202 is locked with projection 203 registering in recess 216. The cap 202 is locked allowing time for the engine to cool even though the switch 193 is shown in an "unlocked fuel cap" 194 position.

Figure 44:
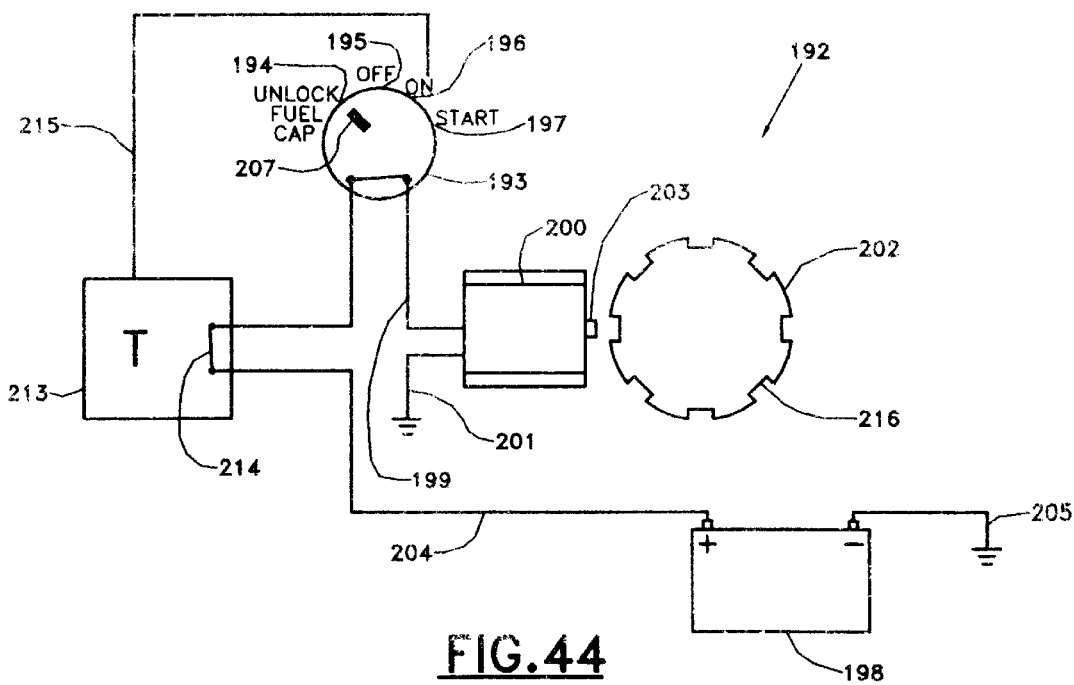
FIG. 44 is a schematic diagram of the twelfth embodiment of the apparatus of the present invention shown with optional timer.

In FIG. 44, after the selected time interval has lapsed, switch member 214 of timer 213 closes as shown in FIG. 44 so that cap 202 can be unlocked when switch 193 is in the unlocked fuel cap 194 position. As shown in FIG. 44, projection 203 has been withdrawn from recess 216 of cap 202.

Figure 45:
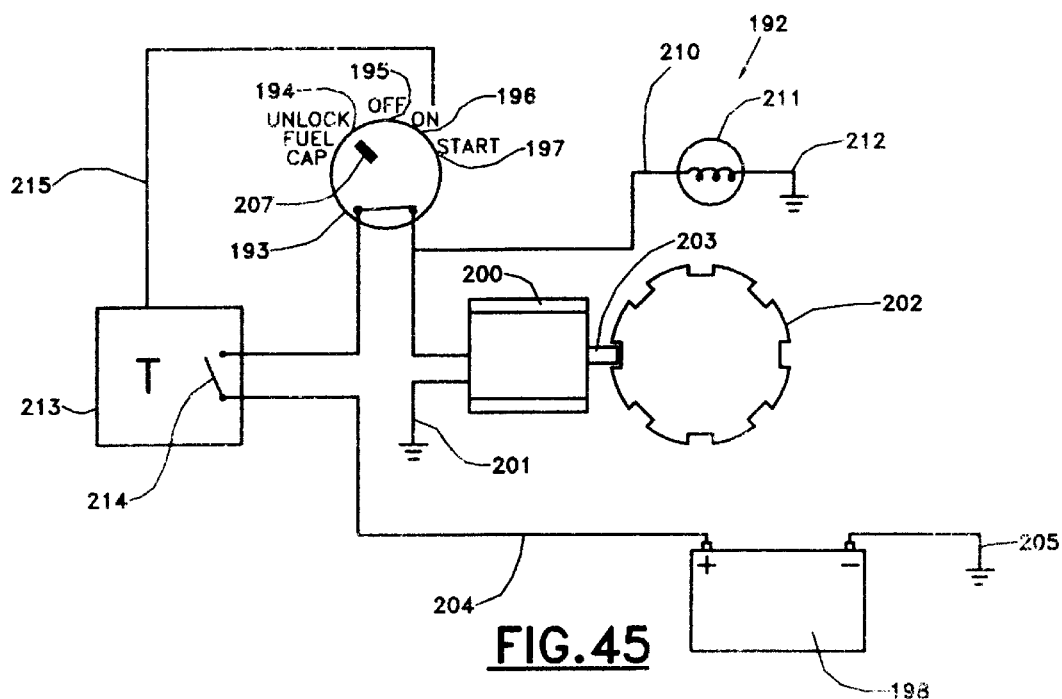
FIG. 45 is a schematic diagram of the twelfth embodiment of the apparatus of the present invention shown with both optional timer and optional indicator light.

In FIG. 45, safety fuel tank and cap apparatus is shown with optional timer 213 and indicator light 211. In FIG. 45, the engine E has just been turned off signaling the timer 213 to open the circuit between battery 198 and key switch 193 until a predetermined time interval has lapsed. Therefore, cap 202 is locked allowing the engine E time to cool even though the switch 193 is shown in the unlocked fuel cap position 194. In FIG. 45, because the cap 202 cannot be opened, the indicator light 211 is not illuminated.

Figure 46:
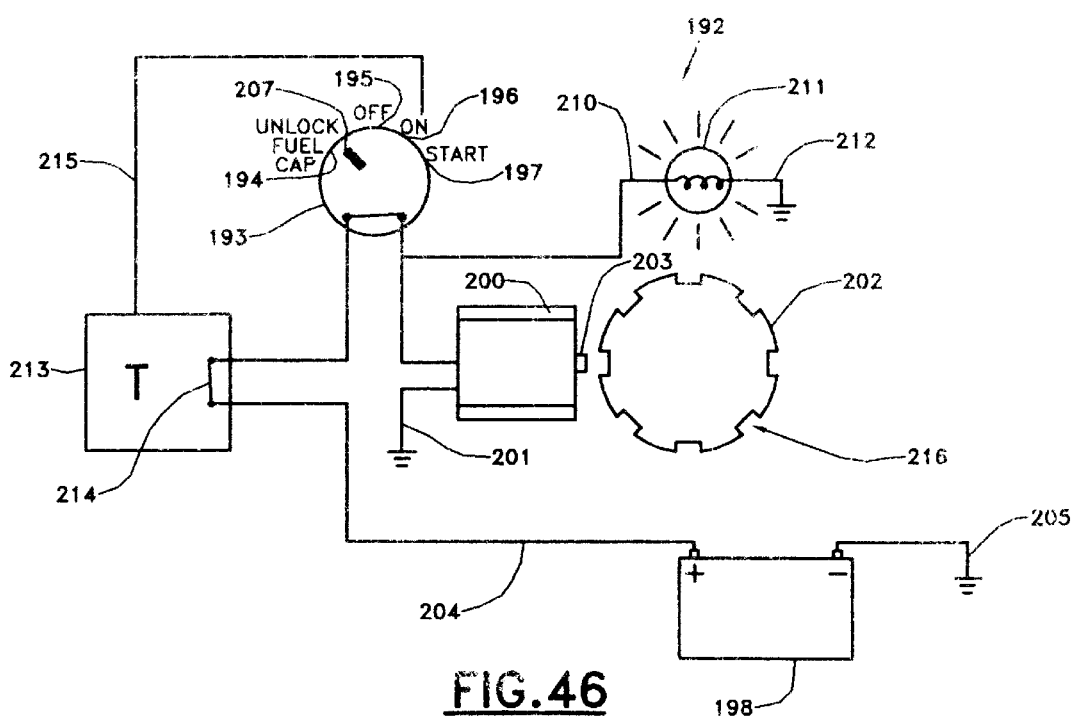
FIG. 46 is a schematic diagram of the twelfth embodiment of the apparatus of the present invention shown with both optional timer and optional indicator light.

In FIG. 46, the engine E has been turned off signaling the timer to open the circuit from the battery 198 to the key switch 193. However, because the desired time interval has lapsed, the engine E has cooled sufficiently and the timer 213 switch member 214 has closed enabling the cap 202 to be opened as projection 203 has been withdrawn by actuator 200 from recess 216. In FIG. 46, indicator lamp 203 is illuminated to show that the cap 202 may be removed.

It should be understood that the cap 202 is preferably mounted to a fuel tank 14 of an engine E such as is shown in FIGS. 1, 1A, 1B, 2, 4, or any of the other embodiments of FIGS. 1–30.

Figure 47:
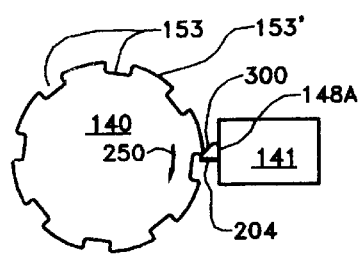
FIG. 47 is a schematic diagram of an alternative embodiment for the plunger showing it partially recessed.
Figure 48:
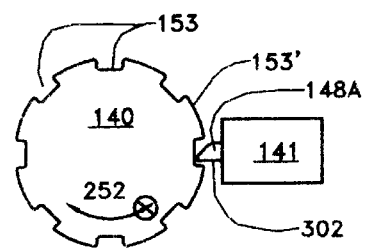
FIG. 48 is a schematic diagram of an alternative embodiment for the plunger showing it fully extended.
Figure 49:
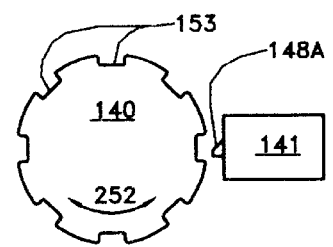
FIG. 49 is a schematic diagram of an alternative embodiment for the plunger showing it fully recessed.

FIGS. 47 through 49 show an alternative embodiment for the plunger 148A allowing gas cap 140 to be tightened even where actuator 141 has plunger 148A in an extended position. Actuator 141 can be constructed as shown in FIGS. 23A and 23B. Plunger 148A has beveled surface 300 and non-beveled surface 302. FIG. 32 shows plunger 148A fully inside one of the plurality of recesses 153. Shown in FIG. 47, as cap 140 is tightened or rotated in the direction of arrow 250, beveled surface 300 comes in contact with the interior surface of recess 153 and causes plunger 148A to be pushed inside actuator 141 in the direction of arrow 254. As cap 140 is further turned in the direction of arrow 250 plunger 148A comes in contact with cap outer surface 153' and continues to remain inside actuator 141 until plunger 148A comes in contact with another recess 153. At this point plunger 148A will extend. The above described ratcheting process will continue until cap 140 is tightened on fuel tank 139. Non-beveled surface 302 will disallow rotation in a counterclockwise direction when it contacts the interior surface of a recess 153.

Figure 50:
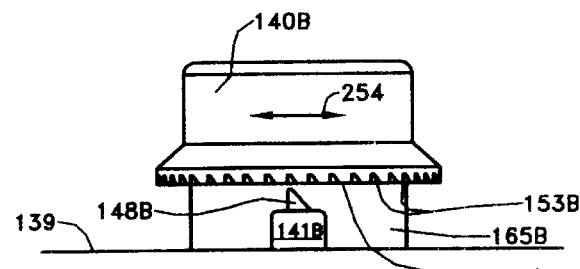
FIG. 50 is a schematic diagram of an alternative embodiment for the plunger, actuator and cap showing it fully recessed.
Figure 51:
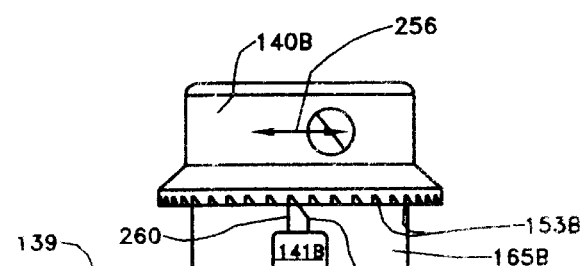
FIG. 51 is a schematic diagram of an alternative embodiment for the plunger, actuator and cap showing it fully extended.
Figure 52:
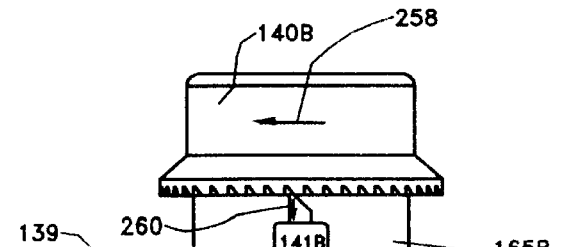
FIG. 52 is a schematic diagram of an alternative embodiment for the plunger, actuator and cap showing it partially recessed.

FIGS. 50 through 52 show an alternative embodiment for the plunger 148B allowing gas cap 140B to be tightened even where actuator 141B has plunger 148A in an extended position. Actuator 141B can be constructed as shown in FIGS. 23A and 23B, however, actuator 141B is placed perpendicular to the surface of fuel tank 139. Plunger 148B has beveled surface 300B and non-beveled surface 302B. FIG. 35 shows plunger 148B fully inside one of the plurality of recesses 153B. Shown in FIG. 36, as cap 140B is tightened or rotated in the direction of arrow 258, beveled surface 300B comes in contact with the interior surface of recess 153B and causes plunger 148B to be pushed inside actuator 141B in the direction of arrow 260. As cap 140B is further turned in the direction of arrow 258 plunger 148B comes in contact with cap outer surface 153B' and continues to remain inside actuator 141B until plunger 148B comes in contact with another recess 153B. At this point plunger 148B will extend. The above described ratcheting process will continue until cap 140B is tightened on fuel tank 139. Non-beveled surface 302B will disallow rotation in a counterclockwise direction when it contacts the interior surface of a recess 153B.

Figure 53:
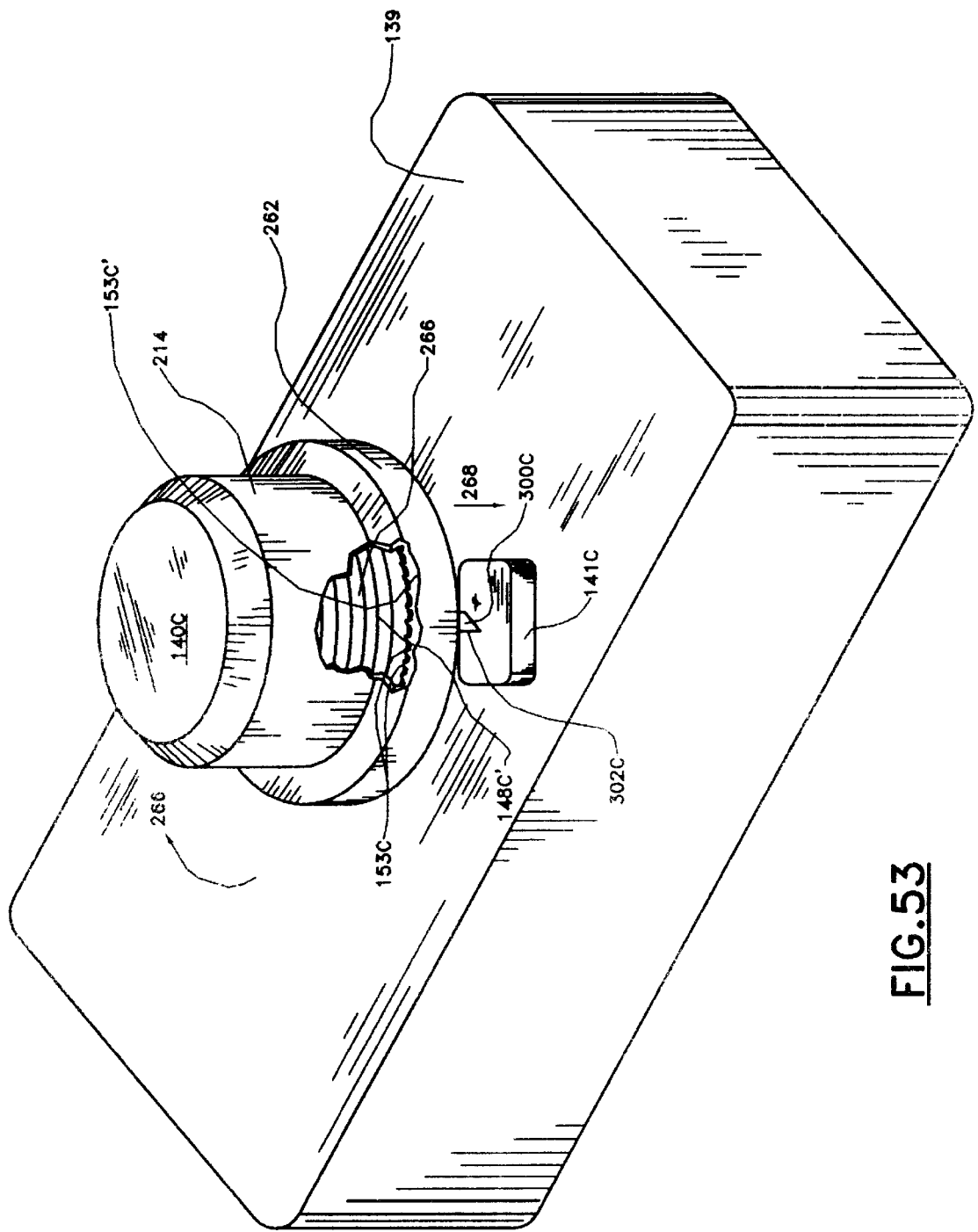
FIG. 53 is a schematic diagram of another alternative embodiment for the plunger, actuator and cap.

FIG. 53 shows an alternative embodiment for plunger 148C allowing gas cap 140C to be tightened even where actuator 141C has plunger 148C in an extended position. Actuator 141C can be constructed as shown in FIGS. 23A and 23B, however, plunger 148C has a tip portion 148C' extending in an upward right angle in relation to the surface of fuel tank 139. Additionally, actuator 141C and plunger 148C are radially aligned with the center of cap 140C. Furthermore, actuator 141C is configured such that plunger 148C extends from actuator 141C when the temperature of the engine is below a predefined point. When activated actuator 141C will cause plunger 148C to recess into actuator 141C thereby causing contact with one of the plurality of recesses 153C. Plunger tip portion 148C' has beveled surface 300C and non-beveled surface 302B. FIG. 53 shows plunger 148C fully inside one of the plurality of recesses 153C. As cap 140C is tightened or rotated in the direction of arrow 266, beveled surface 300C comes in contact with the interior surface of recess 153C and causes plunger 148C to be pushed inside actuator 141C in the direction of arrow 268. As cap 140C is further turned in the direction of arrow 266 plunger 148C comes in contact with cap inner surface 153C' and continues to remain extended from actuator 141C until plunger 148C comes in contact with another recess 153C. At this point plunger 148C will recess. The above described ratcheting process will continue until cap 140C is tightened on fuel tank 139. Non-beveled surface 302C will disallow rotation in a counterclockwise direction when it contacts the interior surface of one of the plurality of recesses 153C.

Figure 54:
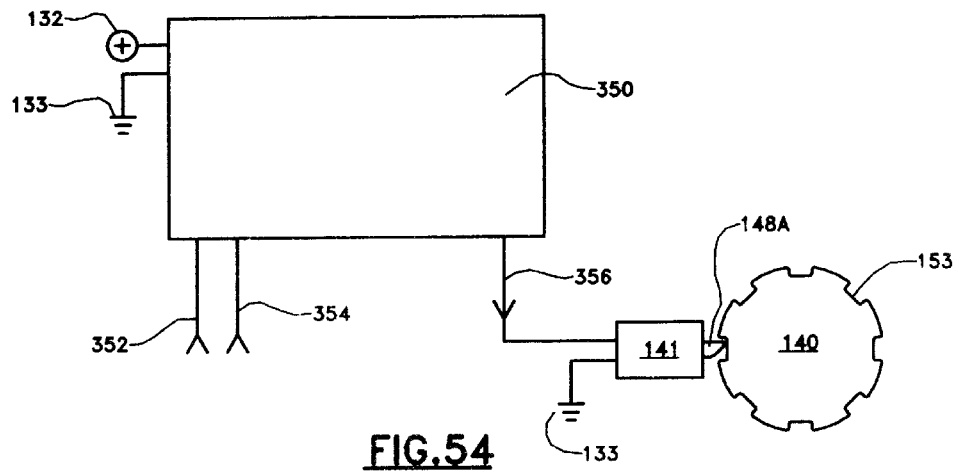
FIG. 54 is a schematic diagram of an alternative embodiment for controlling the actuator.

FIG. 54 shows actuator 141A being controlled by an engine management computer 350 or other system which monitors engine conditions, such as temperature of engine block 129A. Because many modern engines are computer controlled and the computer usually monitors engine condition sensors, such computers would have information to sense conditions which would require locking cap 140. The engine monitor computer 350 can be powered by battery 132 and grounded at point 133. Two data inputs 352 and 354 are shown. These can monitor engine conditions such as temperature, ignition, or other conditions which may provide an incentive to activate actuator 141A. When a triggering condition is sensed, engine management computer 350 activates actuator 141A through line 356 thereby causing plunger 148A to extend into one of the plurality of recesses 153 of cap 140.

Figure 55:
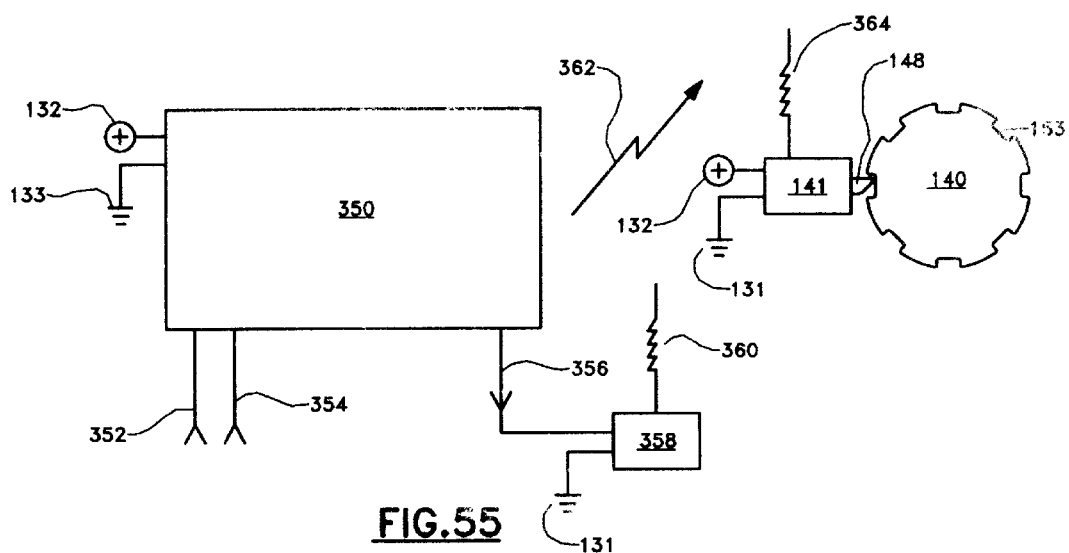
FIG. 55 is a schematic diagram of another alternative embodiment for controlling the actuator.

FIG. 55 shows the engine management computer 350 of FIG. 54 and transmitter 358. Instead of being directly connected to actuator 141A (as in FIG. 54), computer 350 is connected to transmitter 358. Radio waves, infrared, fiber optics, or other signaling devices can remotely control actual 141A. When a triggering condition is sensed, engine management computer 350 activates transmitter 358 which sends a signal 362 through antenna 360. This signal is received by actuator 141A through antenna 364 which thereby causing plunger 148A to extend into one of the plurality of recesses 153 of cap 140. In this embodiment actuator 141A is also connected to battery 132.

PARTS LIST

The following is a list of parts and materials suitable for use in the present invention:

| NUMBER | PART |
|---|---|
| 10 | safety fuel tank and cap apparatus |
| 11 | magnetoelectric generator |
| 12 | pull cord starter rope |
| 13 | electric cable |
| 14 | fuel tank |
| 15 | upper surface |
| 16 | cylindrically shaped flange |
| 16A | cylindrically shaped flange |
| 17 | external thread |
| 18 | opening |
| 19 | filler cap |
| 19A | filler cap |
| 19B | filler cap |
| 19C | hinged filler cap |
| 20 | annular skirt |
| 20A | inner annular surface |
| 20B | outer annular surface |
| 21 | top |
| 22 | handle |
| 23 | internal thread |
| 24 | vent |
| 25 | magnet |
| 26 | outer end |
| 27 | inner end |

-continued

| NUMBER | PART |
|---|---|
| 28 | switch |
| 29A | lead |
| 29B | lead |
| 30 | ground |
| 31 | arrow |
| 32 | arrow |
| 33 | spring |
| 34 | contact plate |
| 35 | contact point |
| 36 | contact point |
| 37 | annular edge |
| 38 | circular cap |
| 39 | annular skirt |
| 40 | safety fuel tank and cap apparatus |
| 41 | cap |
| 42 | handle |
| 43 | vent |
| 44 | annular skirt |
| 45 | top |
| 46 | appendage |
| 47 | undersurface |
| 48 | button switch |
| 49 | contact |
| 50 | contact |
| 51 | spring |
| 52 | contact plate |
| 53 | switch bottom |
| 54 | arrow |
| 55 | arrow |
| 56 | safety fuel tank and cap apparatus |
| 57 | filler cap |
| 58 | annular skirt |
| 59 | top |
| 60 | handle |
| 61 | switch |
| 62 | switch housing |
| 63 | electric eye |
| 64 | arrow |
| 65 | reflector |
| 66 | opening |
| 67 | annular rib |
| 68 | safety fuel tank and cap apparatus |
| 69 | micro switch |
| 70 | switch arm |
| 71 | ring |
| 72 | opening |
| 73 | beam |
| 74 | filler cap |
| 75 | top |
| 76 | annular skirt |
| 77 | handle |
| 78 | shroud |
| 79 | cover |
| 80 | bolt |
| 81 | arrow |
| 82 | fuel line |
| 83 | weed trimmer |
| 84 | annular surface |
| 85 | frame |
| 86 | laterally extending projection |
| 87 | laterally extending projection |
| 88 | outer annular surface |
| 89 | annular edge |
| 90 | circular cap |
| 91 | outer annular surface |
| 92 | annular edge |
| 93 | laterally extending projection |
| 94 | laterally extending projection |
| 95 | gasket seal |
| 96 | hinge |
| 97 | spring loaded cap member |
| 98 | spring loaded latch |
| 99 | pivot |
| 100 | sear |
| 101 | flat top |
| 102 | skirt |
| 103 | outer surface |

-continued

| NUMBER | PART |
|---|---|
| 104 | arrow |
| 105 | safety fuel tank and cap apparatus |
| 106 | fuel tank |
| 107 | upper surface |
| 108 | fuel filler neck |
| 109 | side wall |
| 110 | annular shoulder |
| 111 | adaptor |
| 112 | filler neck |
| 113 | side wall |
| 114 | annular shoulder |
| 115 | slot |
| 116 | slot |
| 117 | micro switch |
| 118 | arm |
| 119 | projection |
| 120 | plunger type switch |
| 121 | plunger |
| 122 | housing |
| 123 | ignition system |
| 124 | key switch |
| 125 | switch |
| 126 | lead |
| 127 | ground |
| 128 | safety fuel tank and cap apparatus |
| 128A | safety fuel tank and cap apparatus |
| 128B | safety fuel tank and cap apparatus |
| 128C | safety fuel tank and cap apparatus |
| 128D | safety fuel tank and cap apparatus |
| 128E | safety fuel tank and cap apparatus |
| 128F | safety fuel tank and cap apparatus |
| 129 | engine |
| 129A | engine block |
| 130 | starter |
| 131 | starter solenoid |
| 132 | battery |
| 133 | ground |
| 134 | battery cable |
| 135 | battery cable |
| 136 | battery cable |
| 137 | heat sensor |
| 138 | cable |
| 139 | fuel tank |
| 140 | fuel cap |
| 140B | fuel cap |
| 140C | fuel cap |
| 141 | actuator |
| 141B | actuator |
| 141C | actuator |
| 142 | actuator housing |
| 143 | housing interior |
| 144 | wire lead |
| 145 | terminal |
| 146 | coil |
| 147 | wire lead |
| 148 | plunger |
| 148A | plunger |
| 148B | plunger |
| 148C | plunger |
| 148C' | tip portion of plunger |
| 149 | flange |
| 150 | spring |
| 151 | anchor plate |
| 152 | arrow |
| 153 | recess |
| 153' | cap outer perimeter |
| 153B | recess |
| 153B' | bottom of cap |
| 153C | recess |
| 153C' | cap inner surface |
| 154 | projecting end |
| 155 | switch |
| 156 | coil |
| 157 | contact bar |
| 158 | terminal |
| 159 | terminal |
| 160 | heat |

-continued

| NUMBER | PART |
|---|---|
| 161 | cap |
| 162 | hinge |
| 163 | latch |
| 164 | arrow |
| 165 | filler neck |
| 166 | opening |
| 167 | arrow |
| 168 | cap |
| 169 | enlarged end portion |
| 170 | rubber contact member |
| 171 | ribbed cap |
| 172 | rib |
| 173 | concave surface |
| 174 | arrow |
| 175 | timer |
| 176 | key switch |
| 177 | key |
| 178 | wire cable |
| 179 | wire cable |
| 180 | wire cable |
| 181 | wire cable |
| 182 | wire cable |
| 183 | plunger |
| 184 | plunger housing |
| 185 | cable |
| 186 | coil housing |
| 187 | heat sensitive coil/bi-metal spring |
| 188 | radial arm |
| 189 | arrow |
| 190 | free end |
| 191 | stop position |
| 192 | safety fuel tank and cap apparatus |
| 193 | key switch |
| 194 | unlock position |
| 195 | off position |
| 196 | on position |
| 197 | start position |
| 198 | battery |
| 199 | lead |
| 200 | switch |
| 201 | ground |
| 202 | cap |
| 203 | projection |
| 204 | lead |
| 205 | ground |
| 206 | switch member |
| 207 | key |
| 208 | heat sensor |
| 209 | switch member |
| 210 | lead |
| 211 | indicator light |
| 212 | ground |
| 213 | timer |
| 214 | switch member |
| 215 | interface |
| 216 | recess |
| 250 | arrow |
| 252 | arrow |
| 254 | arrow |
| 256 | arrow |
| 258 | arrow |
| 260 | arrow |
| 262 | arrow |
| 264 | arrow |
| 266 | arrow |
| 268 | arrow |
| 300 | beveled surface |
| 300B | beveled surface |
| 300C | beveled surface |
| 302 | non-beveled surface |
| 302B | non-beveled surface |
| 302C | non-beveled surface |
| 350 | engine management computer |
| 352 | data input line |
| 354 | data input line |
| 356 | line |
| 358 | transmitter |

-continued

| NUMBER | PART |
|---|---|
| 360 | antenna |
| 362 | signal |
| 364 | receiver |
| S | switch |
| P | projection |
| E | engine |

All measurements disclosed herein are at standard temperature and pressure, at sea level on Earth, unless indicated otherwise.

The foregoing embodiments are presented by way of example only; the scope of the present invention is to be limited only by the following claims.

What is claimed is:

1. A safety fuel tank and filler cap apparatus for supplying fuel to an internal combustion engine that can be started with a magnetoelectric generator, comprising:
   a) an exposed fuel tank having a fill opening, an annular fuel filler flange surrounded by an adjoining fuel tank wall having outer surface, said flange having a central axis;
   b) a filler cap having a cap center, the cap being connectable to the fuel filler flange to form a closure of the tank at the fill opening when the cap center generally aligns with the flange central axis, said filler cap and adjoining fuel tank outer surface being configured to enable a user to grip and turn said fuel filler cap, at a position next to the tank wall; and
   c) a mechanism interfaced between the fuel tank and filler cap that is activated to a safety mode when the engine is at an elevated, operating temperature, said mechanism including a connector that interfaces between the outer surface of the fuel tank and the cap.

2. The apparatus of claim 1 wherein the mechanism includes a switch.

3. The apparatus of claim 2 wherein the switch is a magnetic switch.

4. The apparatus of claim 2 wherein the switch is a photoelectric switch.

5. The apparatus of claim 2 wherein the switch is a mechanical switch that moves between operating and disabled positions, the switch including a member that shifts positions when the fuel filler cap is separated from the fuel filler flange.

6. The apparatus of claim 2 wherein the switch, when activated to a safety mode, moves to a closed position thereby preventing separation of the fuel filler cap from the fuel filler flange.

7. The apparatus of claim 3 wherein the switch includes a magnetic switch mounted on the fuel tank and a magnet mounted on the filler cap.

8. The apparatus of claim 2 wherein the switch includes a switch member mounted on the filler cap that does not interfere with a sealing of the fuel filler flange with the filler cap.

9. The apparatus of claim 8 wherein the fuel filler flange has a threaded portion and the filler cap has a top and an annular skirt with threads thereon that engage the threaded portion of the flange, and wherein the switch member is mounted on the annular skirt in between the threads and the top.

10. The apparatus of claim 8 wherein the filler cap has a top, an annular skirt with internal threads, and an unthreaded outer surface and wherein the switch member is mounted on the annular skirt.

11. The apparatus of claim 8 wherein the filler cap has a top, an annular skirt with internal threads, and an unthreaded outer surface and wherein the switch member is mounted on the top.

12. The apparatus of claim 1 further comprising a key and key switch that has multiple switch positions, including at least a fuel cap unlock position wherein the fuel cap is not removable from the fuel tank if the key is placed in a position other than the fuel cap unlock position.

13. A safety fuel tank and filler cap apparatus for supplying fuel to and internal combustion engine that can be started with a magnetoelectric generator, comprising:
   a) an exposed fuel tank having a fill opening, an annular fuel filler flange surrounded by an adjoining fuel tank outer surface, said flange including a flange wall extending a short distance from the filler opening in said fuel tank wall, said annular flange having a central axis;
   b) a filler cap that fits the fuel filler flange to form a closure of the tank at the fill opening, said filler cap having a center, wherein the adjoining fuel tank outer surface is configured to enable a user to grip and turn said fuel filler cap; and
   c) a mechanism interfaced between the fuel tank and filler cap that alerts a user not to add fuel to the fuel tank if the engine temperature exceeds the fuel ignition temperature for the fuel to be supplied to the engine.

14. The apparatus of claim 13 further comprising a key and key switch that has multiple switch positions, including at least a fuel cap unlock position wherein the fuel cap is not removable from the fuel tank if the key is placed in a position other than the fuel cap unlock position.

15. A safety fuel tank and filler cap apparatus for supplying fuel to an internal combustion engine that can be started with a magnetoelectric generator, comprising:
   a) an exposed fuel tank having a fill opening, upper surface, an annular fuel filler flange surrounded by an adjoining fuel tank wall having outer surface, said flange having a central axis;
   b) a filler cap having a cap center, the cap being connectable to the fuel filler flange to form a closure of the tank at the fill opening when the cap center generally aligns with the flange central axis, the filler cap have a plurality of recesses spaced around the cap, the filler cap and adjoining fuel tank outer surface being configured to enable a user to grip and turn said fuel filler cap, at a position next to the tank wall; and
   c) a mechanism interfaced between the fuel tank and filler cap that is activated to a safety mode when the engine is at an elevated, operating temperature, the mechanism including a connector that interfaces between the fuel tank and at least one of the plurality of recesses.

16. The apparatus of claim 15 wherein the mechanism is attached to the upper surface of the fuel tank.

17. The apparatus of claim 16 wherein the mechanism includes a plunger arm.

18. The apparatus of claim 17 wherein the plunger arm has at least one beveled surface which interfaces with at least one of the plurality of recesses.

19. The apparatus of claim 18 wherein the longitudinal axis of the plunger is generally perpendicular to the upper surface of the fuel tank.

20. The apparatus of claim 18 wherein the longitudinal axis of the plunger is generally parallel to the upper surface of the fuel tank.

21. The apparatus of claim 18 wherein the movement of the plunger is generally perpendicular to the upper surface of the fuel tank.

22. The apparatus of claim 18 wherein the mechanism includes a switch.

23. The apparatus of claim 22 wherein the switch is a magnetic switch.

24. The apparatus of claim 22 wherein the switch is a photoelectric switch.

25. The apparatus of claim 22 wherein the switch is a mechanical switch that moves between operating and disabled positions, the switch including a member that shifts positions when the fuel filler cap is separated from the fuel filler flange.

26. The apparatus of claim 22 wherein the switch, when activated to a safety mode, moves to a closed position thereby counterclockwise rotation of the fuel filler cap from the fuel filler flange.

27. The apparatus of claim 23 wherein the switch includes a magnetic switch mounted on the fuel tank and a magnet mounted on the filler cap.

28. The apparatus of claim 22 wherein the switch includes a switch member mounted on the filler cap that does not interfere with a sealing of the fuel filler flange with the filler cap.

29. The apparatus of claim 28 wherein the fuel filler flange has a threaded portion and the filler cap has atop and an annular skirt with threads thereon that engage the threaded portion of the flange, and wherein the switch member is mounted on the annular skirt in between the threads and the top.

30. The apparatus of claim 28 wherein the filler cap has a top, an annular skirt with internal threads, and an unthreaded outer surface and wherein the switch member is mounted on the annular skirt.

31. The apparatus of claim 28 wherein the filler cap has a top, an annular skirt with internal threads, and an unthreaded outer surface and wherein the switch member is mounted on the top.

32. The apparatus of claim 21 further comprising a key and key switch that has multiple switch positions, including at least a fuel cap unlock position wherein the fuel cap is not removable from the fuel tank if the key is placed in a position other than the fuel cap unlock position.

33. A powered implement, comprising:
   a) a frame;
   b) an internal combustion engine mounted on the frame;
   c) a fuel tank supplying fuel to the internal combustion engine, the fuel tank having a fuel inlet;
   d) a safety mechanism operatively connected to the engine, the safety mechanism being activated to a safety mode when the engine is at an elevated, operating temperature; and
   e) while in safety mode the safety mechanism restricting access to the fuel inlet.

34. The powered implement of claim 33 wherein the safety mechanism is a switch.

35. The powered implement of claim 34 wherein the switch is a mechanical switch that moves between open and shut positions.

36. The powered implement of claim 33 further comprising a key and key switch that has multiple switch positions, including at least a fuel unlock position wherein the safety mechanism is activated in the safety mode if the key is placed in a position other than the fuel unlock position.

37. The powered implement of claim 33, wherein the safety mechanism comprises a hood, the hood restricting access to the fuel inlet while the safety mechanism is in the safety mode.

38. The powered implement of claim 33, wherein:
(i) the safety mechanism comprising an actuator and plunger, the actuator and plunger being activated when the safety mechanism is in the safety mode;
(ii) the fuel inlet comprising a cap, the cap being removably connected to the fuel inlet; and
(iii) when activated, the plunger preventing removal of the fuel cap from the fuel inlet.

39. The powered implement of claim 38, wherein the cap is threadably connected to the fuel inlet, the cap comprising a plurality of recesses, and when activated the plunger entering at least one of the recesses thereby preventing removal of the fuel cap from the fuel inlet.

40. The powered implement of claim 39, wherein the geometry of the plunger and fuel cap facilitate a ratcheting effect allowing the fuel cap to be tightened while the plunger is activated.

41. The powered implement of claim 40, wherein the plunger is angled.

42. The powered implement of claim 33, wherein the safety mechanism comprises a heat sensor, the heat sensor sensing the temperature of the engine.

43. The powered implement of claim 42, wherein the safety mode is initially manually set.

44. The powered implement of claim 33, wherein the safety mechanism comprises a timer, the timer controlling the length of time the safety mechanism remains in the safety mode.

45. The powered implement of claim 33, wherein the safety mechanism comprises an indicator, the indicator indicating the operational status of the safety mechanism.

46. The powered implement of claim 33, wherein the safety mechanism is comprised of an engine management computer operatively connected to the engine.

47. The powered implement of claim 33, wherein the safety mechanism is further comprised of a transmitter and receiver both operatively connected to the safety mechanism, the transmitter transmitting a signal that the status of the safety mode has been changed, the receiver receiving the transmitted signal that the status of the safety mode has been changed.

48. A powered implement, comprising:
a) a frame;
b) an internal combustion engine mounted on the frame;
c) a fuel tank supplying fuel to the internal combustion engine, the fuel tank having a fuel inlet;
d) a system which monitors engine conditions, the system being operatively connected to the engine;
e) a safety mechanism operatively connected to the system, the safety mechanism being activated to a safety mode when at least one preselected condition is met; and
f) while in the safety mode the safety mechanism restricting access to the fuel inlet.

49. The powered implement of claim 48, wherein the system is comprised of an engine management computer operatively connected to the engine.

50. The powered implement of claim 48, wherein the at least one preselected condition is selected from a group of conditions consisting of elevated engine temperature and engine ignition.

51. The powered implement of claim 49, wherein the at least one preselected condition is selected from a group of conditions consisting of elevated engine temperature and engine ignition.

52. The powered implement of claim 48, wherein the safety mechanism is further comprised of a transmitter and receiver both operatively connected to the safety mechanism, the transmitter transmitting a signal that the status of the safety mode has been changed, the receiver receiving the transmitted signal that the status of the safety mode has been changed.

53. The powered implement of claim 48 wherein the safety mechanism is a switch.

54. The powered implement of claim 49 wherein the switch is a mechanical switch that moves between open and shut positions.

55. The powered implement of claim 48 further comprising a key and key switch that has multiple switch positions, including at least a fuel unlock position wherein the safety mechanism is activated in the safety mode if the key is placed in a position other than the fuel unlock position.

56. The powered implement of claim 48, wherein the safety mechanism comprises a hood, the hood restricting access to the fuel inlet while the safety mechanism is in the safety mode.

57. The powered implement of claim 48, wherein:
(i) the safety mechanism comprising an actuator and plunger, the actuator and plunger being activated when the safety mechanism is in the safety mode;
(ii) the fuel inlet comprising a cap, the cap being removably connected to the fuel inlet; and
(iii) when activated, the plunger preventing removal of the fuel cap from the fuel inlet.

58. The powered implement of claim 57, wherein the cap is threadably connected to the fuel inlet, the cap comprising a plurality of recesses, and when activated the plunger entering at least one of the recesses thereby preventing removal of the fuel cap from the fuel inlet.

59. The powered implement of claim 57, wherein the geometry of the plunger and fuel cap facilitate a ratcheting effect allowing the fuel cap to be tightened while the plunger is activated.

60. The powered implement of claim 59, wherein the plunger is angled.

61. The powered implement of claim 48, wherein the safety mechanism comprises a heat sensor, the heat sensor sensing the temperature of the engine.

62. The powered implement of claim 18, wherein the safety mode is initially manually set.

63. The powered implement of claim 48, wherein the safety mechanism comprises a timer, the timer controlling the length of time the safety mechanism remains in the safety mode.

64. The powered implement of claim 48, wherein the safety mechanism comprises an indicator, the indicator indicating the operational status of the safety mechanism.

65. A powered implement, comprising:
a) a frame;
b) an internal combustion engine mounted on the frame;
c) a fuel tank supplying fuel to the internal combustion engine, the fuel tank having a fuel inlet;
d) a safety mechanism operatively connected to the fuel inlet, the safety mechanism being activated in a safety mode and restricting access to the fuel inlet when the engine is at an elevated, operating temperature that is near the ignition temperature of the fuel that powers the engine.

66. The apparatus of claim 65 wherein the safety mechanism is a switch.

67. The apparatus of claim 65 wherein the switch is a mechanical switch that moves between open and shut positions.

68. The apparatus of claim 65 further comprising a key and key switch that has multiple switch positions, including at least a fuel unlock position wherein the safety mechanism is activated in the safety mode if the key is placed in a position other than the fuel unlock position.

69. The powered implement of claim 65, wherein the safety mechanism is comprised of an engine management computer operatively connected to the engine.

70. The powered implement of claim 65, wherein the safety mechanism is further comprised of a transmitter and receiver both operatively connected to the safety mechanism, the transmitter transmitting a signal that the status of the safety mode has been changed, the receiver receiving the transmitted signal that the status of the safety mode has been changed.

71. The powered implement of claim 65, wherein the safety mechanism comprises a hood, the hood restricting access to the fuel inlet while the safety mechanism is in the safety mode.

72. The powered implement of claim 65, wherein:
   (i) the safety mechanism comprising an actuator and plunger, the actuator and plunger being activated when the safety mechanism is in the safety mode;
   (ii) the fuel inlet comprising a cap, the cap being removably connected to the fuel inlet; and
   (iii) when activated, the plunger preventing removal of the fuel cap from the fuel inlet.

73. The powered implement of claim 72, wherein the cap is threadably connected to the fuel inlet, the cap comprising a plurality of recesses, and when activated the plunger entering at least one of the recesses thereby preventing removal of the fuel cap from the fuel inlet.

74. The powered implement of claim 72, wherein the geometry of the plunger and fuel cap facilitate a ratcheting effect allowing the fuel cap to be tightened while the plunger is activated.

75. The powered implement of claim 74, wherein the plunger is angled.

76. The powered implement of claim 65, wherein the safety mechanism comprises a heat sensor, the heat sensor sensing the temperature of the engine.

77. The powered implement of claim 65, wherein the safety mode is initially manually set.

78. The powered implement of claim 65, wherein the safety mechanism comprises a timer, the timer controlling the length of time the safety mechanism remains in the safety mode.

79. The powered implement of claim 65, wherein the safety mechanism comprises an indicator, the indicator indicating the operational status of the safety mechanism.

80. A powered implement, comprising:
   a) a frame;
   b) an internal combustion engine mounted on the frame;
   c) a fuel tank supplying fuel to the internal combustion engine, the fuel tank having a fuel inlet;
   d) a safety mechanism operatively connected to the fuel inlet, the safety mechanism restricting access to the fuel inlet when activated in a safety mode; and
   e) a key and key switch that has multiple switch positions, including at least a fuel unlock position wherein the safety mechanism is activated in the safety mode if the key is placed in a position other than the fuel unlock position.

81. The apparatus of claim 80 wherein the safety mechanism is a switch.

82. The apparatus of claim 81 wherein the switch is a mechanical switch that moves between open and shut positions.

83. The powered implement of claim 80, wherein the safety mechanism is further comprised of an engine management computer operatively connected to the engine.

84. The powered implement of claim 80, wherein the safety mechanism is further comprised of a transmitter and receiver both operatively connected to the safety mechanism, the transmitter transmitting a signal that the status of the safety mode has been changed, the receiver receiving the transmitted signal that the status of the safety mode has been changed.

85. The powered implement of claim 80, wherein the safety mechanism comprises a hood, the hood restricting access to the fuel inlet while the safety mechanism is in the safety mode.

86. The powered implement of claim 80, wherein:
   (i) the safety mechanism comprising an actuator and plunger, the actuator and plunger being activated when the safety mechanism is in the safety mode;
   (ii) the fuel inlet comprising a cap, the cap being removably connected to the fuel inlet; and
   (iii) when activated, the plunger preventing removal of the fuel cap from the fuel inlet.

87. The powered implement of claim 86, wherein the cap is threadably connected to the fuel inlet, the cap comprising a plurality of recesses, and when activated the plunger entering at least one of the recesses thereby preventing removal of the fuel cap from the fuel inlet.

88. The powered implement of claim 86, wherein the geometry of the plunger and fuel cap facilitate a ratcheting effect allowing the fuel cap to be tightened while the plunger is activated.

89. The powered implement of claim 88, wherein the plunger is angled.

90. The powered implement of claim 80, wherein the safety mechanism comprises a heat sensor, the heat sensor sensing the temperature of the engine.

91. The powered implement of claim 80, wherein the safety mode is initially manually set.

92. The powered implement of claim 80, wherein the safety mechanism comprises a timer, the timer controlling the length of time the safety mechanism remains in the safety mode.

93. The powered implement of claim 80, wherein the safety mechanism comprises an indicator, the indicator indicating the operational status of the safety mechanism.

* * * * *